(12) United States Patent
Eguchi

(10) Patent No.: US 10,296,113 B2
(45) Date of Patent: May 21, 2019

(54) POSITION INDICATOR

(71) Applicant: Wacom Co., Ltd., Saitama (JP)

(72) Inventor: Toru Eguchi, Chiba (JP)

(73) Assignee: Wacom Co., Ltd., Saitama (JP)

( * ) Notice: Subject to any disclaimer, the term of this patent is extended or adjusted under 35 U.S.C. 154(b) by 182 days.

(21) Appl. No.: 15/647,580

(22) Filed: Jul. 12, 2017

(65) Prior Publication Data

US 2017/0308185 A1   Oct. 26, 2017

Related U.S. Application Data

(63) Continuation of application No. PCT/JP2016/053886, filed on Feb. 10, 2016.

(30) Foreign Application Priority Data

Feb. 12, 2015   (JP) .................. 2015-024851

(51) Int. Cl.
*G06F 3/033*   (2013.01)
*G06F 3/038*   (2013.01)
(Continued)

(52) U.S. Cl.
CPC ......... *G06F 3/0383* (2013.01); *G01D 5/2046* (2013.01); *G01D 5/251* (2013.01);
(Continued)

(58) Field of Classification Search
CPC .... G06F 3/0354; G06F 3/03545; G06F 3/038; G06F 3/041; G06F 3/0416; G06F 3/044; G06F 3/046; G01D 5/20; G01L 1/14
See application file for complete search history.

(56) References Cited

U.S. PATENT DOCUMENTS 8,913,041 B2   12/2014   Fukushima et al.
9,063,025 B2   6/2015   Horie et al.
(Continued)

FOREIGN PATENT DOCUMENTS

EP   2 998 832 A1   3/2016
JP   2011-186803 A   9/2011
(Continued)

OTHER PUBLICATIONS

Extended European Search Report, dated Feb. 28, 2018, for European Application No. 16749257.8-1216 / 3258349, 9 pages.
(Continued)

*Primary Examiner* — Joe H Cheng
(74) *Attorney, Agent, or Firm* — Seed IP Law Group LLP

(57) ABSTRACT

A plurality of core bodies are housed within a casing having an opening portion on one end side. A core body selecting mechanism is provided which includes a plurality of operating portions coupled to each of the plurality of core bodies, and makes at least a tip of one core body among the plurality of core bodies selectively project from the opening portion of the casing. A pen pressure detecting portion common to the plurality of core bodies is provided within the casing. When the operating portion is operated to make at least the tip of the one core body project from the opening portion, part of the operated operating portion engages with the pen pressure detecting portion common to the plurality of core bodies, and the pen pressure detecting portion detects a pen pressure applied to the tip projected from the opening portion.

20 Claims, 13 Drawing Sheets

(51) Int. Cl.
*G06F 3/046* (2006.01)
*G01D 5/20* (2006.01)
*G01L 1/14* (2006.01)
*G01L 9/00* (2006.01)
*G06F 3/0354* (2013.01)
*G06F 3/041* (2006.01)
*G01D 5/251* (2006.01)
*G06F 3/044* (2006.01)
*H01G 5/14* (2006.01)

(52) U.S. Cl.
CPC ............ *G01L 1/142* (2013.01); *G01L 9/0073* (2013.01); *G06F 3/038* (2013.01); *G06F 3/03545* (2013.01); *G06F 3/046* (2013.01); *G06F 3/0416* (2013.01); *G06F 3/044* (2013.01); *H01G 5/14* (2013.01)

(56) References Cited

U.S. PATENT DOCUMENTS

| | | |
|---|---|---|
| 2011/0219892 A1 | 9/2011 | Fukushima et al. |
| 2013/0199311 A1 | 8/2013 | Horie et al. |
| 2014/0253442 A1 | 9/2014 | Eruchimovitch |
| 2015/0035764 A1 | 2/2015 | Michihata et al. |
| 2015/0247743 A1 | 9/2015 | Horie et al. |
| 2016/0187217 A1 | 6/2016 | Horie et al. |
| 2016/0188008 A1 | 6/2016 | Horie et al. |
| 2017/0322643 A1* | 11/2017 | Eguchi ............... G06F 3/044 |
| 2017/0341458 A1* | 11/2017 | Kaneda ............... G06F 3/03 |
| 2017/0357340 A1* | 12/2017 | Kamiyama ........... G06F 3/044 |
| 2019/0025951 A1* | 1/2019 | Kamiyama ........... B43K 7/12 |

FOREIGN PATENT DOCUMENTS

| | | | |
|---|---|---|---|
| JP | 2012-234423 A | | 11/2012 |
| JP | 2012234423 A | * | 11/2012 |
| JP | 2013-65937 A | | 4/2013 |
| JP | 2013065937 A | * | 4/2013 |
| JP | 2013-161307 A | | 8/2013 |
| WO | 2014/208219 A1 | | 12/2014 |

OTHER PUBLICATIONS

International Search Report, dated Apr. 19, 2016, for corresponding International Application No. PCT/JP2016/053886, 4 pages.

* cited by examiner

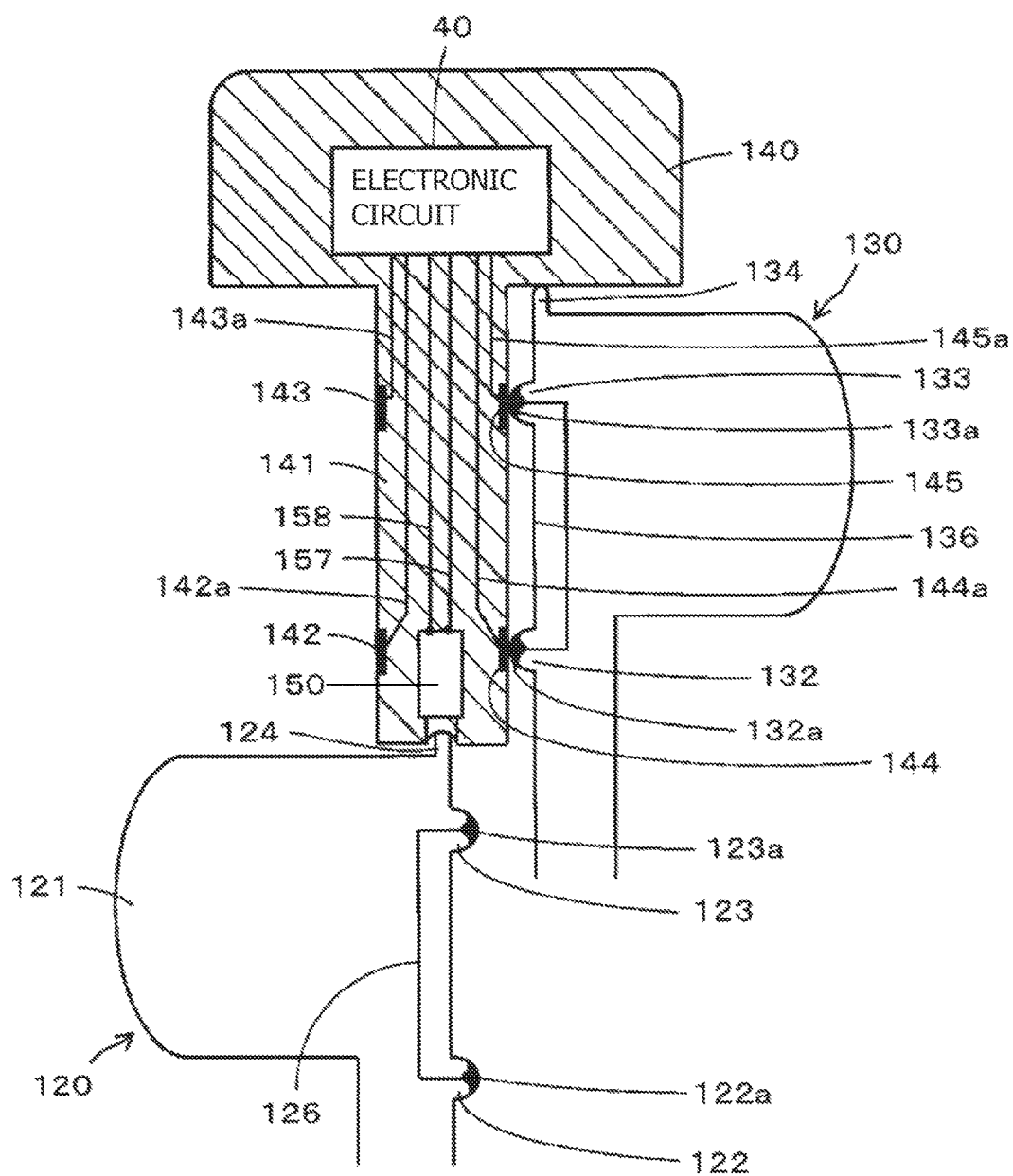

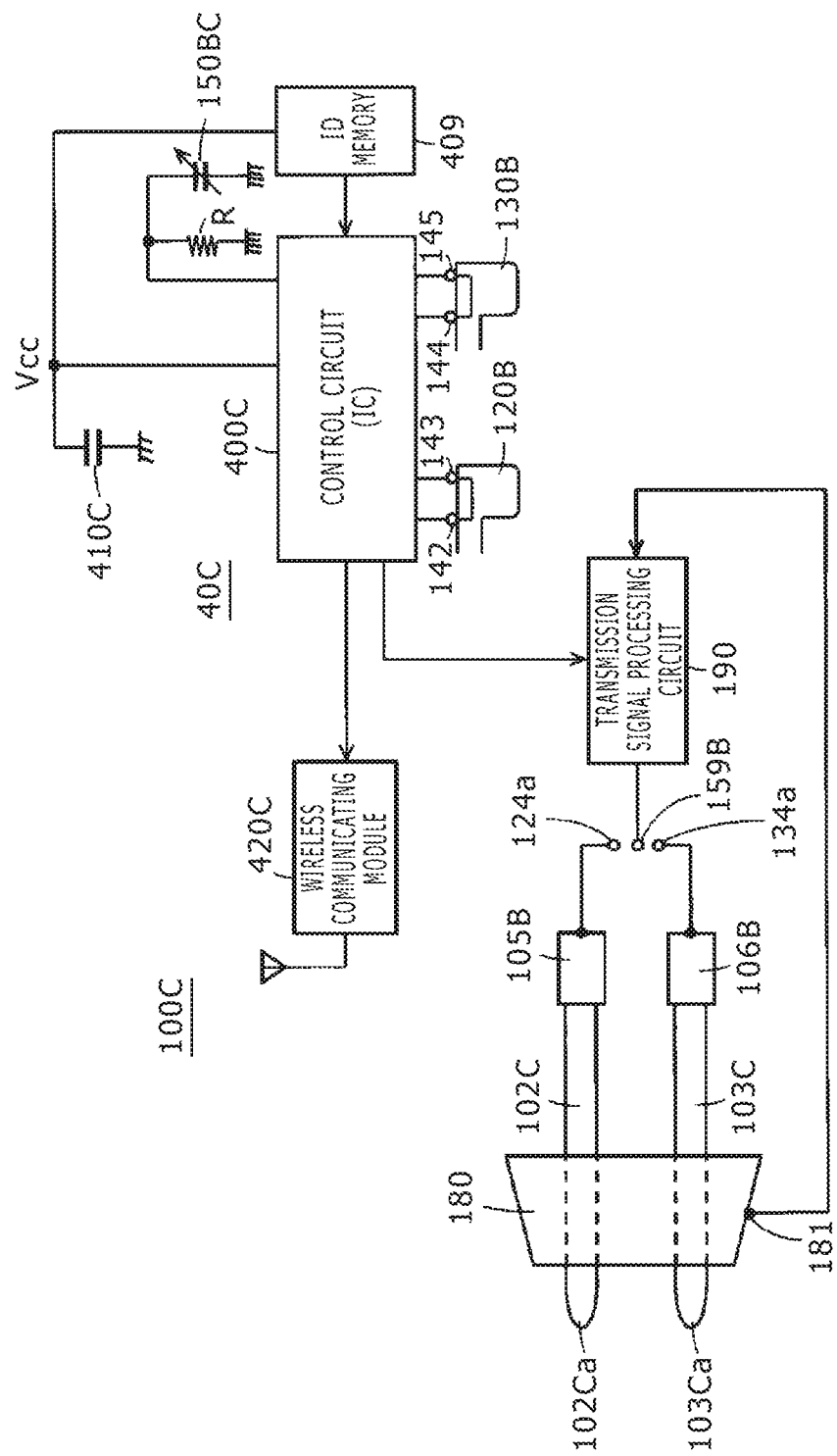
F I G. 12

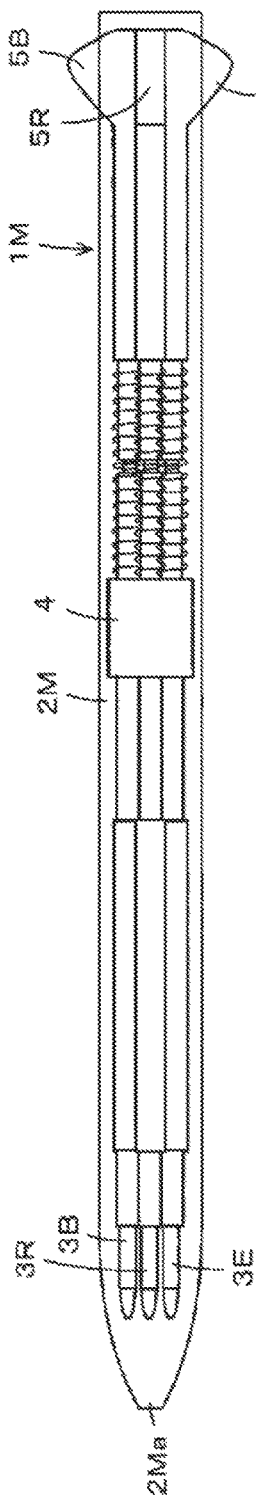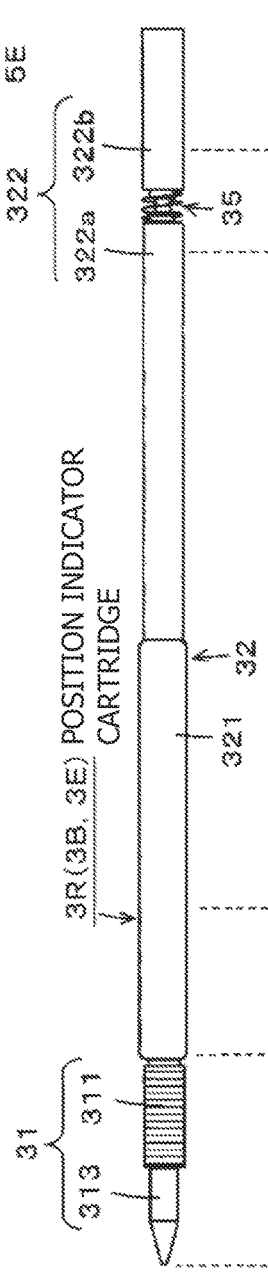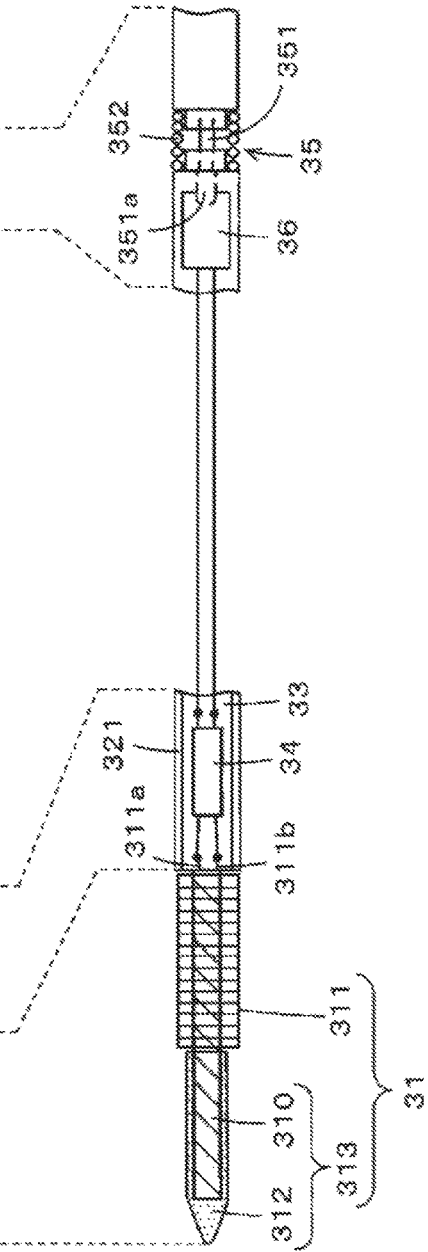
FIG. 14A
FIG. 14B
FIG. 14C

POSITION INDICATOR

BACKGROUND

Technical Field

The present invention relates to a position indicator used in conjunction with a position detecting device. The position indicator includes a plurality of core bodies and has a pen pressure detecting function.

Description of the Related Art

A conventional pen as a writing instrument, such as a multi-color ballpoint pen or the like, houses a plurality of ballpoint pen cores filled with ink of different colors in one common casing. The use of this multi-color ballpoint pen enables writing in a plurality of colors with one pen, even when a plurality of pens having ink of different colors are not carried. The multi-color ballpoint pen is thus very convenient.

A position indicator, referred to as an electronic pen, is known as means for performing indication input on a portable terminal, such as a pad type personal computer, a mobile telephone terminal, or the like. A portable terminal for which this kind of position indicator is used as input means typically includes a sensor for position detection in a state of being superposed on a display screen, and is capable of receiving fine indication and operating input on the display screen by the position indicator. The use of the position indicator enables fine indication input that is difficult to perform with a mouse, a finger, or the like, and is thus very useful.

One of a plurality of operations with the position indicator is performed when a picture is drawn. When a picture is drawn, a plurality of colors and the like are used freely to draw the picture. Conventionally, an electronic apparatus, such as a portable terminal or the like, incorporating a position detecting device used in conjunction with the position indicator presents a menu of colors or the like for a line input by indication input using the position indicator, and a user of the position indicator selects a desired color from the menu, whereby the color of the input by the position indicator is changed. Alternatively, there is a case where a plurality of electronic pens set in predetermined colors are used.

There is also a case where, for example, a form or a contract is placed on a sensor that detects a position indicated by the position indicator, and handwriting is desired to be retained electronically while the document is directly signed. This is realized by incorporating a core of a ballpoint pen in a casing of the position indicator, as described in Patent Document 1 (Japanese Patent Laid-Open No. 2012-234423), for example.

PRIOR ART DOCUMENT

Patent Document

Patent Document 1: Japanese Patent Laid-Open No. 2012-234423

BRIEF SUMMARY

Technical Problems

There has been an increasingly strong demand for electronic pens (position indicators) capable of dealing with recent diversification of usage modes as described above. Accordingly, a position indicator has been considered which has functions of a plurality of electronic pens so as to be capable of a plurality of colors or functions or the like. As one approach method, there is a method of converting an electronic pen into a cartridge, and, as in a case of refills for a ballpoint pen, incorporating the cartridge into a casing similar to the casing of a multi-color ballpoint pen.

As an example of a position indicator adopting this approach method, a position indicator 1M as indicated in FIG. 14A-C, which position indicator is not publicly known, has been considered. As indicated in FIG. 14A, the position indicator 1M in the present example houses three position indicator cartridges 3R, 3B, and 3E within a casing 2M. One of the three position indicator cartridges 3B, 3R, and 3E is selected by a knock mechanism, and is used in a state in which a tip of a pen tip portion of the selected position indicator cartridge is projected from an opening 2Ma on a pen tip side of the casing 2M.

Here, each of the position indicator cartridges 3B, 3R, and 3E in the present example is of a type that is coupled to a position detecting device by an electromagnetic induction system, and is formed in the same size as refills for commercially available knock type ballpoint pens in order to have a constitution compatible with the refills for the commercially available ballpoint pens. Therefore, the casing 2M has the same constitution as the casing and the knock mechanism of a commercially available knock type multi-color ballpoint pen, and the casing and the knock mechanism of a commercially available knock type multi-color ballpoint pen can be used as the casing 2M as they are.

The position indicator cartridges 3B, 3R, and 3E of the position indicator 1M in the example of FIG. 14A all have a same constitution, but are assigned respective functions, for example, line colors or line types, such as a solid line, a broken line, and the like, on the basis of identification information sent out from the respective position indicator cartridges 3B, 3R, and 3E.

For example, the position indicator cartridge 3B is assigned a function of indicating, in black, a trajectory (a character or a figure) displayed according to positions indicated by the position indicator cartridge 3B. The position indicator cartridge 3R is assigned a function of indicating, in red, a trajectory displayed according to positions indicated by the position indicator cartridge 3R. The position indicator cartridge 3E is assigned a function of erasing a trajectory previously input by indication input according to positions indicated by the position indicator cartridge 3E.

The position detecting device used in conjunction with the position indicator cartridges 3B, 3R, and 3E receives the identification information transmitted from the respective position indicator cartridges 3B, 3R, and 3E; distinguishes differences between the position indicator cartridges 3B, 3R, and 3E; and implements the functions assigned to the respective position indicator cartridges 3B, 3R, and 3E.

FIG. 14B is a diagram indicating an example of constitution of the position indicator cartridges 3B, 3R, and 3E. FIG. 14C is a diagram of assistance in explaining a constitution of parts of the position indicator cartridges 3B, 3R, and 3E which cartridges are indicated in FIG. 14B.

As indicated in FIG. 14B, the position indicator cartridges 3B, 3R, and 3E have a constitution in which a core body portion 31 and a tubular body portion 32 are coupled and integrated with each other. As indicated in FIG. 14C, the core body portion 31 is configured such that a coil 311 is partly wound around a magnetic core, or a ferrite core 310 in the present example, and a pen tip portion 313 is formed by covering a part of the core, which part is not wound with the coil 311, by a protective material 312.

The tubular body portion 32 includes a first tubular body portion 321 in which electronic circuit parts are arranged and a second tubular body portion 322 in which parts for pen pressure detection are arranged. As indicated in FIG. 14C, a printed board 33 is disposed within the first tubular body portion 321 of the tubular body portion 32, and a circuit part 34 including a capacitor forming a resonance circuit together with the coil 311 is disposed on the printed board 33.

The core body portion 31 and the first tubular body portion 321 of the tubular body portion 32 are coupled to each other with, for example, part of the ferrite core 310 of the core body portion 31 inserted into the first tubular body portion 321, and are thus formed integrally with each other.

The second tubular body portion 322 in the present example is formed by a tubular body having a diameter substantially equal to the diameter of an ink housing portion of a refill for a commercially available ballpoint pen. As indicated in FIG. 14B, the second tubular body portion 322 is divided in two parts, that is, a long portion 322a and a short portion 322b, and a pen pressure detecting portion 36 is disposed in the vicinity of a coupling portion 35 coupling the long portion 322a and the short portion 322b to each other.

As indicated in FIG. 14C, the long portion 322a and the short portion 322b are coupled to each other at the coupling portion 35 via a coupling rod member 351 and a coil spring 352. In this case, the long portion 322a and the short portion 322b are always elastically displaced in an axial direction so as to be separated from each other by the coil spring 352, but are locked in predetermined positions by the coupling rod member 351 and thus prevented from being further displaced in the axial direction.

As indicated in FIG. 14C, the pen pressure detecting portion 36 is disposed in the long portion 322a. An end 351a side of the coupling rod member 351 acts as a pressing portion for the pen pressure detecting portion 36.

The pen pressure detecting portion 36 in the present example has the constitution of a variable capacitor whose capacitance changes according to a pen pressure.

In one embodiment, the variable capacitor uses pen pressure detection means described in Patent Document: Japanese Patent Laid-Open No. 2011-186803.

When a pressure is applied to the tip of the position indicator cartridge 3B, 3R, or 3E, the force acts to move the entire long portion 322a side of the position indicator cartridge 3B, 3R, or 3E to the short portion 322b side against the elastic force of the coil spring 352, and the capacitance of the pen pressure detecting portion 36 becomes correspondent to the pen pressure. Hence, by detecting the capacitance of the pen pressure detecting portion 36, it is possible to detect the pressure (pen pressure) applied to the tip of the position indicator cartridge 3B, 3R, or 3E.

The position indicator cartridges 3B, 3R, and 3E having the constitution as described above are housed within the casing 2M by being fitted through a holder portion 4 to knock rods 5B, 5R, and 5E, respectively, which constitute part of a knock mechanism of the position indicator 1M. When one of the knock rods 5B, 5R, and 5E is slidingly moved to the pen tip side, the pen tip (tip) of one of the position indicator cartridges 3B, 3R, and 3E is projected. Then, the resonance circuit constituted of the coil 311 wound around the ferrite core 310 of the position indicator cartridge whose tip is projected and the capacitor not indicated in the figures is electromagnetically coupled to a sensor of the position detecting device. The position indicator cartridge whose tip is projected can thus perform position indication by exchanging signals with the position detecting device.

The position indicator 1M configured as described above has an advantage of being able to use the casing of a multi-color ballpoint pen as a commercially available writing instrument as it is. On the other hand, the position indicator 1M has problems as follows.

The position indicator 1M uses position indicator cartridges made replaceable with refills for a commercially available ballpoint pen. The position indicator cartridges each need to include a pen pressure detecting portion and also include an electronic circuit part for exchanging signals with the sensor side of the position detecting device.

Therefore, each of the position indicator cartridges is expensive. There is thus a problem of increased cost for users desiring to use a plurality of kinds of position indicator cartridges (for example, for black, for red, and for an eraser or the like).

One or more embodiments of the present invention provide a position indicator that can solve the above problems.

Technical Solution

In order to solve the above problems, one or more embodiments of the present invention provides a position indicator that uses a dedicated casing rather than using the casing of a commercially available multi-color ballpoint pen as it is.

Specifically, according to one or more embodiments of the present invention, there is provided a position indicator that includes a tubular casing having an opening portion on one end side; a plurality of core bodies housed within the casing; a core body selecting mechanism including a plurality of operating portions coupled to the respective core bodies. The core body selecting mechanism makes at least a tip of one core body coupled to an operated operating portion among the plurality of core bodies selectively project from the opening portion. The position indicator also includes a pen pressure detecting portion that is common to the plurality of core bodies. The pen pressure detecting portion is disposed within the casing. When the operating portion is operated to make at least the tip of the one core body project from the opening portion, a part of the operated operating portion engages with the pen pressure detecting portion, and the pen pressure detecting portion detects a pen pressure applied to the tip projected from the opening portion.

In one or more embodiments of the present invention, the pen pressure detecting portion common to the plurality of core bodies is disposed within the casing. When an operating portion of the core body selecting mechanism is operated to make at least the tip of one core body project from the opening portion, a part of the operated operating portion engages with the pen pressure detecting portion. The pen pressure detecting portion can detect a pen pressure applied to the tip of the core body projected from the opening portion.

Hence, the position indicator according to one or more embodiments of the present invention uses one pen pressure detecting portion common to the plurality of core bodies, and therefore does not need to have expensive position indicator cartridges each including a pen pressure detecting portion as described earlier. It is thus possible to realize a position indicator that can be used inexpensively by users desiring to use a plurality of kinds of functions, such as for black, for red, and for an eraser.

Advantageous Effect

According to one more embodiments of the present invention, a position indicator having one pen pressure detecting portion common to a plurality of core bodies is provided. There is thus no need for expensive position indicator cartridges each including a pen pressure detecting portion as described earlier. Therefore an economic burden on users can be reduced.

BRIEF DESCRIPTION OF THE SEVERAL VIEWS OF THE DRAWINGS

FIG. 2 is a diagram of assistance in explaining parts in the example of mechanical constitution of the first embodiment of the position indicator according to the present invention.

FIG. 12 is a block diagram indicating an example of configuration of an electronic circuit of the fourth embodiment of the position indicator according to the present invention.

FIG. 14A is a diagram of assistance in explaining an example of constitution of a position indicator that has been previously proposed but is not publicly known.

FIG. 14B is a diagram of assistance in explaining a position indicator cartridge in the example of constitution of the position indicator that has been previously proposed but is not publicly known.

FIG. 14C is a diagram of assistance in explaining a constitution of parts of the position indicator cartridge in the example of constitution of the position indicator that has been previously proposed but is not publicly known.

DETAILED DESCRIPTION

Modes for Carrying Out the Invention

A few embodiments of a position indicator according to the present invention will hereinafter be described with reference to the drawings.

First Embodiment

Figure 1A:
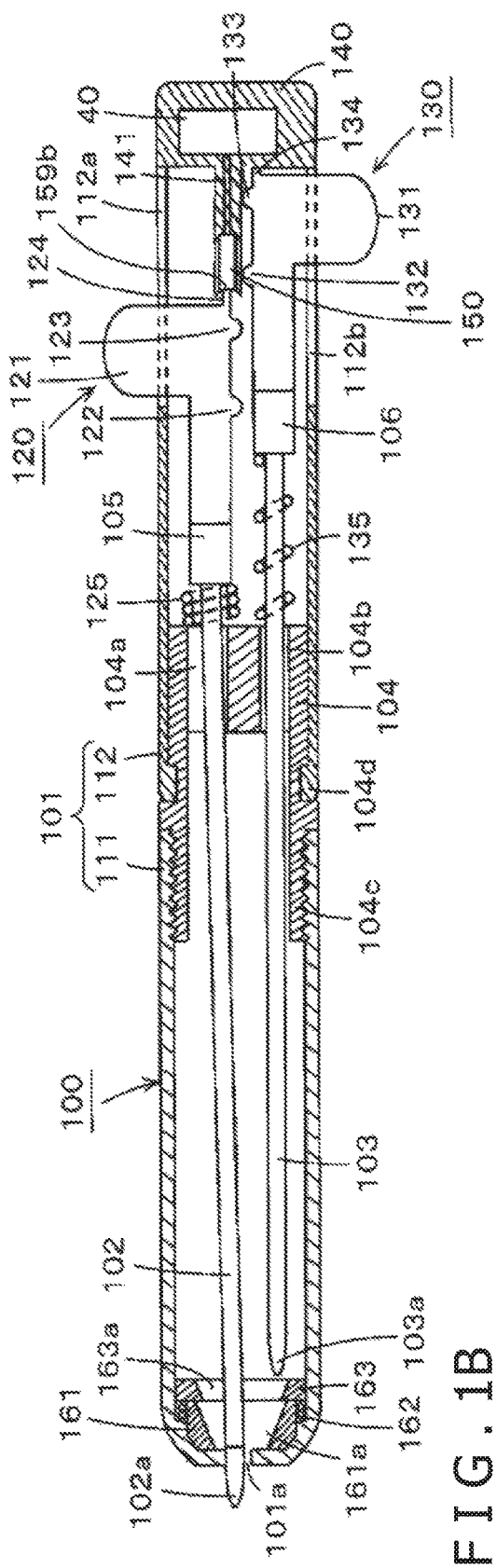
FIG. 1A is a diagram of assistance in explaining an example of mechanical constitution of a first embodiment of a position indicator according to the present invention.
Figure 1B:
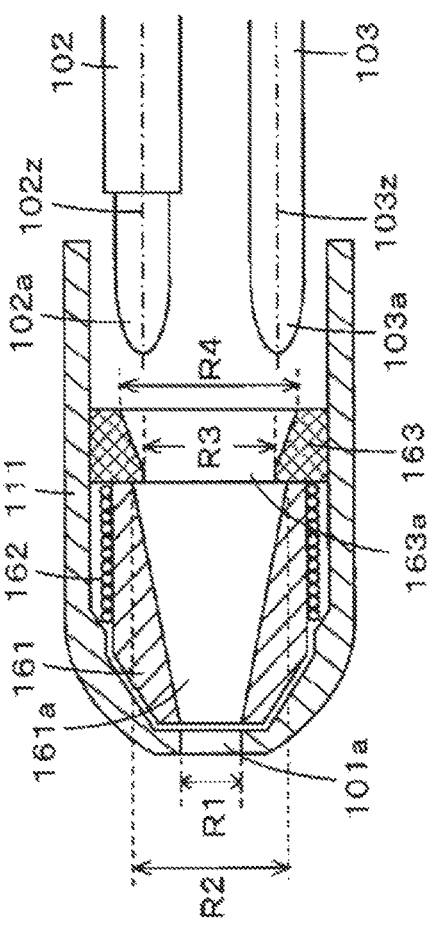
FIG. 1B is a diagram of assistance in explaining an opening portion side in the example of mechanical constitution of the first embodiment of the position indicator according to the present invention.

FIG. 1A is a diagram of assistance in explaining a constitution of the whole of a position indicator 100 according to a first embodiment of the present invention. In particular, FIG. 1A is a longitudinal sectional view of the position indicator 100 according to the first embodiment. FIG. 1B is a diagram indicating a constitution on an opening portion side of a casing 101 of the position indicator 100 according to the first embodiment, from which opening portion side a tip of a core body projects.

As indicated in FIG. 1A, the position indicator 100 houses two core bodies, that is, a first core body 102 and a second core body 103 within the casing 101. The tip of one core body (tip 102a of the first core body 102 in the example of FIG. 1A) of the two core bodies 102 and 103 that is selected by a core body selecting mechanism, projects from an opening portion 101a formed on one end side in an axial direction of the casing 101.

The casing 101 is formed of a tubular body. The opening portion 101a is formed on the one end side in the axial direction of the casing 101. In the present example, as indicated in FIGS. 1A and 1B, a first casing portion 111 and a second casing portion 112 are two portions divided in the axial direction of the casing 101 and are integrally coupled to each other by being coupled to parts of a core body holder 104. The opening portion 101a of the casing 101 is formed on an opposite side from a side of the first casing portion 111 that is coupled to the core body holder 104.

The core body holder 104 includes through holes 104a and 104b through which the first and second core bodies 102 and 103 are inserted, respectively. As indicated in FIG. 1A, the first casing portion 111 is coupled by screwing to the core body holder 104 at a screw portion 104c of the core body holder 104. The second casing portion 112 is coupled by fitting at a fitting portion 104d of the core body holder 104.

The second casing portion 112 is provided with a first knock operating portion 120 for the first core body 102 and a second knock operating portion 130 for the second core body 103, and is provided with a locking member 140 for locking the movement in the axial direction of the first knock operating portion 120 and the second knock operating portion 130. The locking member 140 is formed of a resin, for example. In the present embodiment, the locking member 140 is disposed on another end side of the casing 101 which end side is opposite from the one end side where the opening portion 101*a* is formed, and the locking member 140 also constitutes a cap portion of the casing 101.

The locking member 140 is provided with a stopper 141 for locking the first knock operating portion 120 and the second knock operating portion 130 in a state of being slidingly moved to the opening portion 101*a* side. The stopper 141 has a rod shape, and is formed such that the position of a central axis of the stopper 141 coincides with the position of a central axis of the casing 101.

As indicated in FIG. 1A and FIG. 2, which is a partial enlarged view of FIG. 1A, a pen pressure detecting portion 150 is provided within the stopper 141. The pen pressure detecting portion 150 in the present example has the constitution of a variable capacitor whose capacitance changes according to a pen pressure. In one embodiment, the variable capacitor uses pen pressure detection means described in the above-described Patent Document: Japanese Patent Laid-Open No. 2011-186803.

Figure 3:
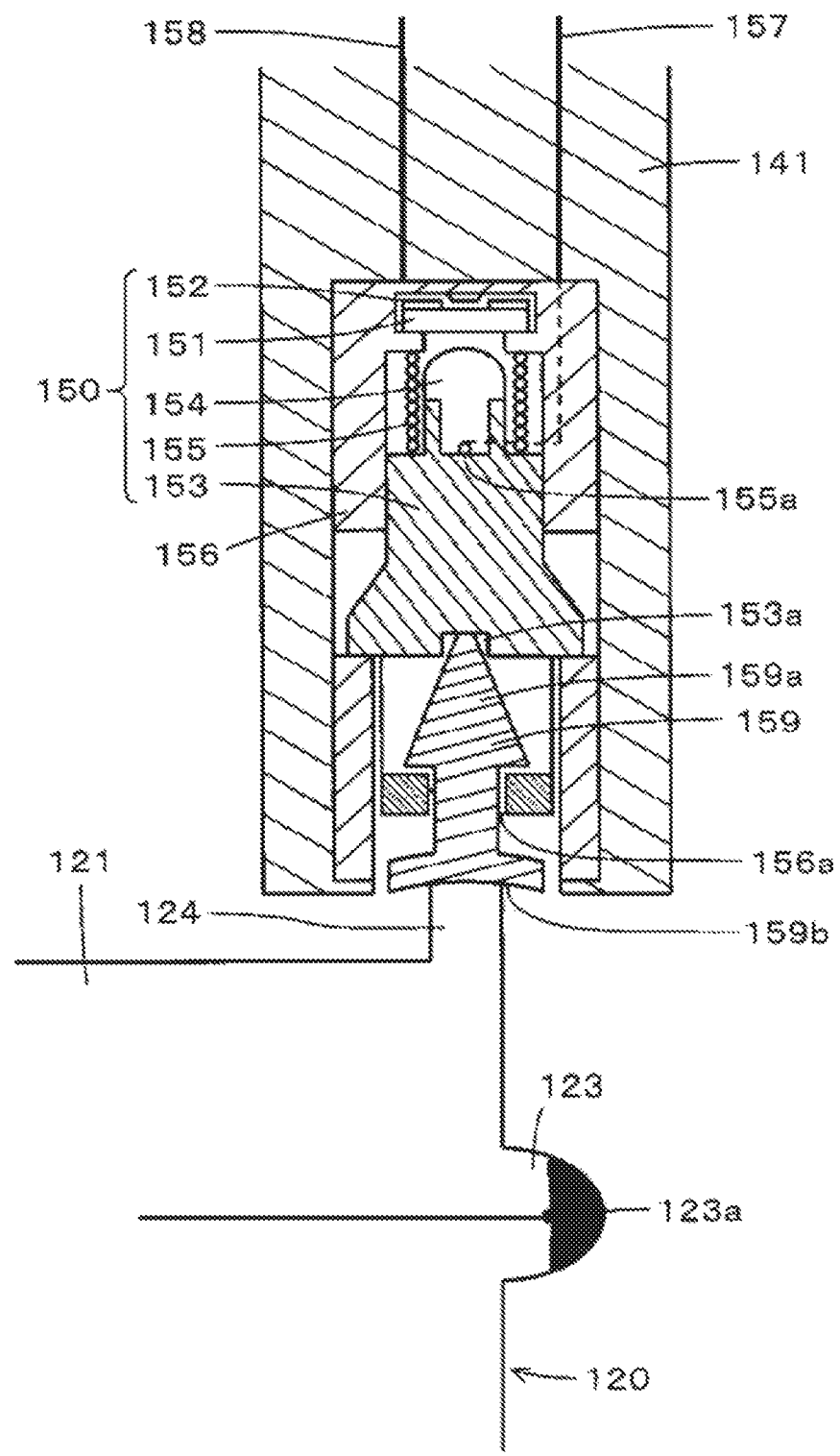
FIG. 3 is a diagram of assistance in explaining parts in the example of mechanical constitution of the first embodiment of the position indicator according to the present invention.

FIG. 3 indicates an example of mechanical constitution of the pen pressure detecting portion 150 in the present example. The pen pressure detecting portion 150 is constituted of a plurality of parts, which include a dielectric 151, a terminal member 152, a retaining member 153, a conductive member 154, and an elastic member 155. The plurality of parts 151 to 155 are arranged in the axial direction and housed within a hollow portion of a holder 156 formed by a tubular body disposed within the stopper 141.

The variable capacitor formed as the pen pressure detecting portion 150 in the present example is formed by interposing the dielectric 151 between the terminal member 152 constituting one electrode of the variable capacitor and the conductive member 154 constituting another electrode of the variable capacitor. Lead portions 157 and 158 are led out from the terminal member 152 and the conductive member 154 to the outside of the holder 156. As indicated in FIG. 2, these lead portions 157 and 158 are connected to an electronic circuit 40 disposed within a part of the cap portion of the locking member 140. Incidentally, it is not essential that the electronic circuit 40 be disposed within the locking member 140, but the electronic circuit 40 may be disposed anywhere as long as the electronic circuit 40 is disposed at a position that does not obstruct the sliding movement of the knock operating portions 120 and 130 within a hollow portion of the casing 101.

The retaining member 153 retaining the conductive member 154 is disposed so as to be movable in the axial direction within the holder 156. The retaining member 153 is biased to the core body side at all times by the elastic member 155 formed by a coil spring made of a conductive material. The conductive member 154 and the elastic member 155 are electrically connected to each other. One end 155*a* of the coil spring forming the elastic member 155 is connected as the other electrode of the variable capacitor to the lead portion 157.

As indicated in FIG. 3, the retaining member 153 is provided with a recessed hole 153*a* on a side as a core body side in the axial direction of the retaining member 153. A tip 159*a* of a pressure transmitting member 159 is fitted into the recessed hole 153*a* of the retaining member 153. The pressure transmitting member 159 penetrates a through hole 156*a* formed in an end portion of the holder 156, and is attached to the holder 156 so as to be slidable in the axial direction of the holder 156 within the hollow portion of the holder 156. In the present example, as indicated in FIG. 3, the pressure transmitting member 159 has such a shape as not to fall off the through hole 156*a* of the holder 156 to the core body side.

A recessed portion 159*b* having a section thereof formed by a bow-shaped curved surface, for example, is formed at an end portion of the pressure transmitting member 159 which end portion is on an opposite side from a fitting side of the pressure transmitting member 159, the pressure transmitting member 159 being fitted into the retaining member 153 on the fitting side. As will be described later, a protruding portion 124 or 134 of the operating portion 120 or the operating portion 130 engages with the recessed portion 159*b*. The curved surface of the recessed portion 159*b* facilitates the engagement of the protruding portion 124 or the protruding portion 134 of the operating portion 120 or the operating portion 130, respectively, with the recessed portion 159*b*, and ensures the locking of the protruding portion 124 or the protruding portion 134 of the operating portion 120 or the operating portion 130, respectively, to the recessed portion 159*b*.

When a pressure directed from the opening portion 101*a* side of the casing 101 to the locking member 140 side is applied to the pressure transmitting member 159, the pressure transmitting member 159 is axially displaced in the direction of the locking member 140 according to the pressure. This displacement displaces the retaining member 153 of the pen pressure detecting portion 150 to the dielectric 151 side against the elastic biasing force of the elastic member 155. As a result, the conductive member 154 fitted to the retaining member 153 is displaced to the dielectric 151 side, and a distance between the conductive member 154 and the dielectric 151 and further an area of contact between the conductive member 154 and the dielectric 151 change according to the pressure applied to the pressure transmitting member 159. Thus, the capacitance of the variable capacitor constituting the pen pressure detecting portion 150 changes according to the pressure applied via the pressure transmitting member 159. The change in the capacitance is detected by the electronic circuit 40, and thereby the pen pressure is detected.

The first knock operating portion 120 includes: a projecting portion 121 that projects from a slit 112*a* formed in the second casing portion 112 to the outside; projecting portions 122 and 123 that project in the direction of the central axis of the second casing portion 112; and the protruding portion 124 that engages with the recessed portion 159*b* of the pressure transmitting member 159 of the pen pressure detecting portion 150 disposed in the stopper 141. Similarly, the second knock operating portion 130 includes: a projecting portion 131 that projects from a slit 112*b* formed in the second casing portion 112 to the outside; projecting portions 132 and 133 that project in the direction of the central axis of the second casing portion 112; and the protruding portion 134 that engages with the recessed portion 159*b* of the pressure transmitting member 159 of the pen pressure detecting portion 150 disposed in the stopper 141.

In addition, core body fitting portions 105 and 106 are provided to end portions on the opening portion 101*a* side in the axial direction of the first knock operating portion 120 and the second knock operating portion 130, respectively. As indicated in FIG. 1A, the first core body 102 can be coupled and fitted to the first knock operating portion 120 by inserting an end portion of the first core body 102, which end portion is on an opposite side from the tip 102a of the first core body 102, through the through hole 104a of the core body holder 104, and then press-fitting the end portion of the first core body 102 into the core body fitting portion 105 of the first knock operating portion 120. The first core body 102 is thereby housed within the casing 101.

Similarly, as indicated in FIG. 1A, the second core body 103 can be coupled and fitted to the second knock operating portion 130 by inserting an end portion of the second core body 103, which end portion is on an opposite side from a tip 103a of the second core body 103, through the through hole 104b of the core body holder 104, and then press-fitting the end portion of the second core body 103 into the core body fitting portion 106 of the second knock operating portion 130. The second core body 103 is thereby housed within the casing 101.

Incidentally, the first core body 102 and the second core body 103 are detachably fitted into the core body fitting portion 105 and the core body fitting portion 106, respectively, and are, thus, replaceable.

As indicated in FIG. 1A, a spring 125 in a state of being inserted around the first core body 102 is provided between the core body holder 104 and the core body fitting portion 105, and a spring 135 in a state of being inserted around the second core body 103 is provided between the core body holder 104 and the core body fitting portion 106. These springs 125 and 135 are elastic members for returning the knock operating portions 120 and 130 to original positions.

In the present example, the knock operating portions 120 and 130, the locking member 140 including the stopper 141, and the springs 125 and 135 constitute an example of a core body selecting mechanism. That is, a user can slidingly move the projecting portion 121 of the knock operating portions 120, which projects from the slit 112a formed in the second casing portion 112, in the direction of the opening portion 101a (which direction will hereinafter be referred to as a pen tip direction) in a state of being guided by the slit 112a against the elastic force of the spring 125. Similarly, a user can slidingly move the projecting portion 131 of the knock operating portions 130, which projects from the slit 112b formed in the second casing portion 112, in the pen tip direction of the opening portion 101a in a state of being guided by the slit 112b against the elastic force of the spring 135.

When the knock operating portion 120 is slidingly moved to a predetermined position, the protruding portion 124 of the slidingly moved knock operating portion 120 engages with the recessed portion 159b of the pressure transmitting member 159 of the pen pressure detecting portion 150 disposed in the stopper 141, and is locked at the position of the recessed portion 159b. Similarly, when the knock operating portion 130 is slidingly moved to a predetermined position, the protruding portion 134 of the slidingly moved knock operating portion 130 engages with the recessed portion 159b of the pressure transmitting member 159 of the pen pressure detecting portion 150 disposed in the stopper 141, and is locked at the position of the recessed portion 159b. FIG. 1A indicates a state in which the knock operating portion 120 is locked in a state in which the tip 102a of the first core body 102 projects from the opening portion 101a to the outside of the casing 101 after the knock operating portion 120 is slidingly moved. The first core body 102 can receive a pen pressure when the tip 102a projects from the opening portion 101a to the outside.

When the second knock operating portion 130 is slidingly moved in the pen tip direction in a state in which the tip 102a of the first core body 102 projects to the outside as indicated in FIG. 1A, the tip 102a of the first core body 102 can be returned to a state of being housed within the casing 101, and the tip 103a of the second core body 103 can be changed to a state of projecting to the outside of the casing 101.

In this case, when an operation of slidingly moving the projecting portion 131 of the second knock operating portion 130 in the pen tip direction (knock operation) is performed, the projecting portions 132 and 133 of the knock operating portion 130 act to push out the first knock operating portion 120 in the direction of the slit 112a. The protruding portion 124 of the first knock operating portion 120 thereby comes off the recessed portion 159b of the pressure transmitting member 159 of the pen pressure detecting portion 150. Then, the first knock operating portion 120 is biased in an opposite direction from the pen tip direction by the restoring force of the spring 125, moved along the stopper 141, and locked by the cap portion of the locking member 140, thus resulting in a state in which the tip 102a is housed within the casing 101.

Then, the protruding portion 134 of the second knock operating portion 130 is fitted into the recessed portion 159b of the pressure transmitting member 159 of the pen pressure detecting portion 150 disposed in the stopper 141, and is locked at the position of the recessed portion 159b. The tip 103a of the second core body 103 is projected from the opening portion. When the tip 103a is thus projected to the outside, the second core body 103 can receive a pen pressure.

When the first knock operating portion 120 is slidingly moved in the pen tip direction from this state, the projecting portions 122 and 123 of the first knock operating portion 120 act to push out the second knock operating portion 130 in the direction of the slit 112b. The protruding portion 134 of the second knock operating portion 130 thereby comes off the recessed portion 159b of the pressure transmitting member 159 of the pen pressure detecting portion 150 disposed in the stopper 141. The second knock operating portion 130 is biased in the opposite direction from the pen tip direction by the restoring force of the spring 135, moved along the stopper 141, and locked by the cap portion of the locking member 140, thus resulting in a state in which the tip 103a of the second core body 103 is housed within the casing 101. Instead, the tip 102a of the first core body 102 is projected to the outside of the casing 101.

As described above, a knock operation changes the position indicator 100 according to the present embodiment to either a state (first state) in which the tip 102a of the first core body 102 projects from the opening portion 101a to the outside and the second core body 103 is housed within the casing 101, a state (second state) in which the tip 103a of the second core body 103 projects from the opening portion 101a to the outside and the first core body 102 is housed within the casing 101, or a state (third state) in which both the first core body 102 and the second core body 103 are housed within the casing 101.

Incidentally, during a state in which the tip of one core body, that is, the first core body 102 or the second core body 103, projects from the opening portion 101a, when the knock operating portion to which the other core body is coupled by fitting is operated halfway before reaching a state in which the tip of the other core body is projected from the opening portion 101a and locked, the tip of the core body which tip projects from the opening portion 101a is brought into a state of being housed within the casing 101. The third state is thus brought about in which both the first core body 102 and the second core body 103 are housed within the casing 101.

In the present embodiment, the electronic circuit 40 is configured to be able to determine whether the first knock operating portion 120 and the second knock operating portion 130 are in either the first state, the second state, or the third state, as follows.

In the present embodiment, at least tip portions 122a and 123a of the projecting portions 122 and 123, respectively, of the first knock operating portion 120, and at least tip portions 132a and 133a of the projecting portions 132 and 133, respectively, of the second knock operating portion 130 are formed of a conductive material. The tip portion 122a and the tip portion 123a of the projecting portions 122 and 123, respectively, of the first knock operating portion 120 are electrically connected to each other by a conductor 126. Similarly, the tip portion 132a and the tip portion 133a of the projecting portions 132 and 133, respectively, of the second knock operating portion 130 are electrically connected to each other by a conductor 136.

On the other hand, as indicated in FIG. 2, the stopper 141 is provided with contact portions 142 and 143 formed of a conductor metal, for example, at respective positions against which the tip portions 122a and 123a of the projecting portions 122 and 123, respectively, of the first knock operating portion 120 abut when the first knock operating portion 120 and the second knock operating portion 130 are in the second state or the third state. Similarly, the stopper 141 is provided with electrodes 144 and 145 formed of a conductor metal, for example, at respective positions against which the tip portions 132a and 133a of the projecting portions 132 and 133, respectively, of the second knock operating portion 130 abut in the first state or the third state. Each of the contact portions 142, 143, 144, and 145 is electrically connected to the electronic circuit 40 by conductors 142a, 143a, 144a, and 145a, respectively.

Hence, when the first knock operating portion 120 and the second knock operating portion 130 are in the third state, the contact portions 142 and 143 are electrically connected to each other through the conductor 126, and the contact portions 144 and 145 are electrically connected to each other through the conductor 136. In addition, when the first knock operating portion 120 and the second knock operating portion 130 are in the first state, the contact portions 142 and 143 are electrically disconnected from each other, and the contact portions 144 and 145 are electrically connected to each other through the conductor 136. Further, when the first knock operating portion 120 and the second knock operating portion 130 are in the second state, the contact portions 142 and 143 are electrically connected to each other through the conductor 126, and the contact portions 144 and 145 are electrically disconnected from each other.

As described above, the electronic circuit 40 can determine whether the first knock operating portion 120 and the second knock operating portion 130 are in either the first state, the second state, or the third state by detecting an electric connection state between the contact portions 142 and 143 (whether the contact portions 142 and 143 are connected each other through the conductor 126 or disconnected from each other) and an electric connection state between the contact portions 144 and 145 (whether the contact portions 144 and 145 are connected to each other through the conductor 136 or disconnected from each other). The electronic circuit 40 can detect the electric connection state between the contact portions 142 and 143 by supplying a signal from one conductor side, for example, the contact portion 142 side, and determining whether or not the signal can be detected on the contact portion 143 side. The electric connection state between the contact portions 144 and 145 can also be detected in a similar manner.

In the position indicator 100 according to the present embodiment, a ferrite core 161 as an example of a magnetic core is disposed on the opening portion 101a side of the first casing portion 111. A coil 162 is wound around the ferrite core 161. Each of one end and another end of the coil 162 is electrically connected to the electronic circuit 40.

As will be described later, the electronic circuit 40 is provided with a capacitor (capacitor 401 in FIG. 4) connected in parallel with the coil 162 to form a resonance circuit, as will be described later. This resonance circuit is used to exchange signals between the position indicator 100 and a sensor of a position detecting device, so that the position detecting device can detect a position indicated by the position indicator 100.

As indicated in FIGS. 1A and 1B, a through hole 161a through which the first core body 102 or the second core body 103 is inserted is formed in the ferrite core 161. The ferrite core 161 is disposed in an end portion on the opening portion 101a side of the first casing portion 111 such that the position of a central axis of the through hole 161a coincides with the position of the central axis of the casing 101, and such that the through hole 161a communicates with the opening portion 101a of the casing 101.

As indicated in FIG. 1B, a diameter of the through hole 161a which diameter is on the opening portion 101a side is substantially the same as a diameter R1 of the opening portion 101a. A diameter R2 of the through hole 161a which diameter is on an opposite side from the opening portion 101a side is selected to be larger than the diameter R1 on the opening portion 101a side (R1<R2). In this case, the diameter R2 of the through hole 161a which diameter is on the opposite side from the opening portion 101a side is desirably set to be a dimension such that extensions of center lines 102z and 103z of the tip 102a of the first core body 102 and the tip 103a of the second core body 103 are included within the diameter R2 in a state in which the tip 102a of the first core body 102 and the tip 103a of the second core body 103 are both housed within the casing 101 (third state described above), as indicated in FIG. 1B.

An inner wall surface of the through hole 161a of the ferrite core 161 is formed in a tapered shape so as to become gradually narrower from the diameter R2 to the diameter R1. Here, the tapered surface as the inner wall surface of the through hole 161a does not have to change in diameter linearly as long as the tapered surface changes in diameter so as to decrease gradually from the diameter R2 to the diameter R1.

As indicated in FIGS. 1A and 1B, the ferrite core 161 is fixed in a state of being pressed to the opening portion 101a side of the first casing portion 111 by a fixing member 163. The fixing member 163 is a member that has a ring shape having a through hole 163a. The diameter of an outer circumferential side surface of the fixing member 163 is a value substantially equal to the inside diameter of the first casing portion 111 or slightly smaller than the inside diameter of the first casing portion 111. The fixing member 163 is fixed to the inside of the first casing portion 111 by, for example, bonding the outer circumferential side surface of the fixing member 163 to an inner wall surface of the first casing portion 111. Thereby the ferrite core 161 is also fixed to the inside of the first casing portion 111.

The fixing member 163 is formed such that the position of a central axis of the through hole 163a coincides with the position of the central axis of the through hole 161a of the ferrite core 161, and such that the through hole 163a communicates with the through hole 161a of the ferrite core 161. As indicated in FIG. 1B, a diameter R3 of the through hole 163a of the fixing member 163, which diameter is on the opening portion 101a side, is a value equal to or smaller than the diameter R2 of the through hole 161a of the ferrite core 161, which diameter is on the opposite side from the opening portion 101a side (R3≤R2).

In addition, a diameter R4 of the through hole 163a of the fixing member 163, which diameter is on the opposite side from the opening portion 101a side, is selected to be a value larger than the diameter R2 of the through hole 161a of the ferrite core 161, which diameter is on the opposite side from the opening portion 101a side (R4>R2).

An inner wall surface of the through hole 163a of the fixing member 163 is formed in a tapered shape so as to become gradually narrower from the diameter R4 to the diameter R3. Here, the tapered surface as the inner wall surface of the through hole 163a does not have to change in diameter linearly as long as the tapered surface changes in diameter so as to decrease gradually from the diameter R4 to the diameter R3.

As a result of the diameters R3 and R4 of the through hole 163a of the fixing member 163 being selected as described above, as indicated in FIG. 1B, the extensions of the center lines 102z and 103z of the tip 102a of the first core body 102 and the tip 103a of the second core body 103 are included within the diameter R4 of the fixing member 163 in a state in which the tip 102a of the first core body 102 and the tip 103a of the second core body 103 are both housed within the casing 101 (third state described above).

As indicated in FIG. 1B, in the state in which the tip 102a of the first core body 102 and the tip 103a of the second core body 103 are both housed within the casing 101 (third state described above), the tip 102a of the first core body 102 and the tip 103a of the second core body 103 are at positions separated from the through hole 163a of the fixing member 163.

As described earlier, when either the knock operating portion 120 or the knock operating portion 130 is operated and slidingly moved to the pen tip direction side, the first core body 102 or the second core body 103 corresponding to the knock operating portion 120 or the knock operating portion 130 is first guided into the through hole 161a of the ferrite core 161 while guided by the surface of the taper-shaped part of the through hole 163a of the fixing member 163. Then, according to the operation of slidingly moving either the knock operating portion 120 or the knock operating portion 130, the tip 102a of the first core body 102 or the tip 103a of the second core body 103 penetrates the through hole 161a of the ferrite core 161, and projects from the opening portion 101a to the outside, as indicated in FIG. 1A.

Incidentally, the first core body 102 and the second core body 103 according to the present embodiment can bend in a direction intersecting the axial direction of the first core body 102 and the second core body 103.

The first core body 102 in the present example has the constitution of the core of a commercially available ballpoint pen. The tip 102a is formed of a metal, for example, and the first core body 102 includes a tubular member made of a resin which member is internally filled with black ink, for example, to feed the black ink into the tip 102a. As is well known, the core of the ballpoint pen can bend in a direction intersecting the axial direction of the ballpoint pen.

The second core body 103 in the present example is an electronic pen core configured as a core body of an electromagnetic induction type electronic pen. The electronic pen core is formed of a relatively hard and elastic resin material, for example, polyoxymethylene (POM), and can bend in a direction intersecting the axial direction of the electronic pen core. A resin material made to have permeability equal to or substantially equal to permeability of the ballpoint pen core as an example of the first core body 102 by including, for example, magnetic powder in the resin material is selected as the resin material forming the second core body 103.

As described above, in the position indicator 100 according to the present embodiment, one ferrite core 161 common to the first core body 102 and the second core body 103 is provided on the one end side of the casing 101 which end side constitutes a pen tip. Because of the tapered shape of the through hole 161a of the ferrite core 161, the first core body 102 or the second core body 103 is inserted into the through hole 161a of the ferrite core 161 easily.

In addition, in the present embodiment, the through hole 163a having a taper-shaped inner wall surface is also formed in the fixing member 163 that fixes the ferrite core 161 within the casing 101. Thus, due to the through hole 163a of the fixing member 163, the first core body 102 or the second core body 103 is guided into the through hole 161a of the ferrite core 161 easily.

In the present embodiment, the resonance circuit formed by the coil 162 wound around the ferrite core 161 and the capacitor provided to the electronic circuit 40 exchanges signals with the sensor of the position detecting device.

Figure 4:
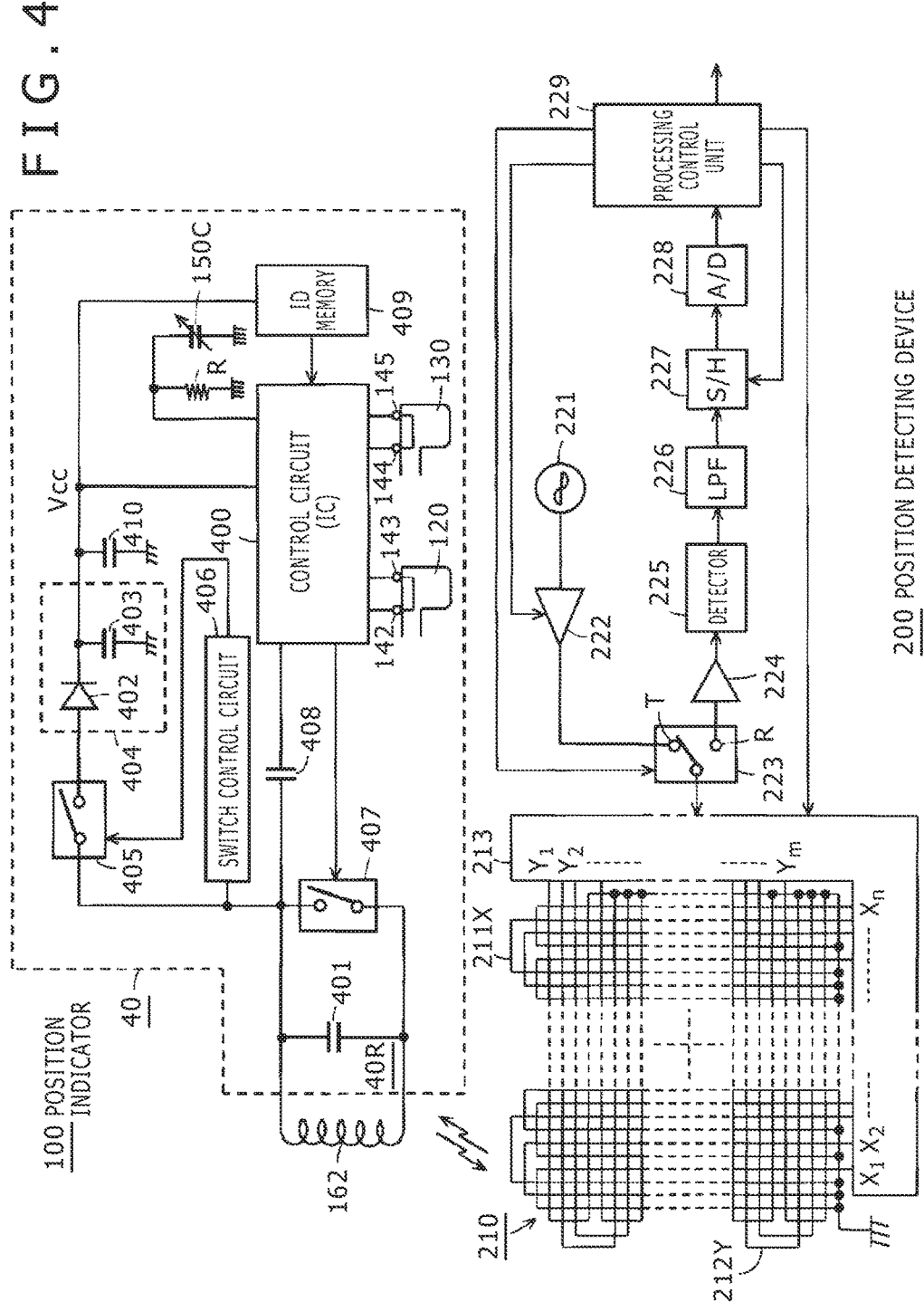
FIG. 4 is a block diagram indicating an example of configuration of an electronic circuit of the first embodiment of the position indicator according to the present invention together with an example of circuit configuration of a corresponding position detecting device.

Example of Circuit Configuration of Electronic Circuit 40 of Position Indicator 100 and Example of Circuit Configuration of Position Detecting Device FIG. 4 is a diagram indicating an example of the electronic circuit 40 of the position indicator 100 according to the present embodiment together with an example of circuit configuration of the position detecting device 200 that performs signal transmission and reception to and from the position indicator 100 by electromagnetic induction coupling.

The position indicator 100 in the present embodiment is configured to transmit and receive a position detection signal to and from conductors of the sensor of the position detecting device 200 by electromagnetic induction coupling, and transmit, to the position detecting device 200, pen pressure information detected through the pen pressure detecting portion 150, identification information (ID) of the position indicator 100 itself, and identification information (ID) indicating whether a core body whose tip projects from the opening portion 101a is either the first core body 102 or the second core body 103, that is, identification information of the first core body 102 or identification information of the second core body 103.

Specifically, as indicated in FIG. 4, in the electronic circuit 40 of the position indicator 100, a parallel resonance circuit 40R is formed by connecting the capacitor 401 in parallel with the coil 162 wound around the ferrite core 161.

As indicated in FIG. 4, the electronic circuit 40 includes a control circuit 400 that controls transmission of additional information. In the present example, the control circuit 400 is configured as an integrated circuit (IC). The IC constituting the control circuit 400 is configured to operate on a power supply voltage Vcc obtained from an electric double layer capacitor 410 as an example of storage means. An alternating-current signal received in the parallel resonance circuit 40R from the position detecting device 200 by electromagnetic coupling is rectified by a rectifier circuit 404 that includes a diode 402 and a capacitor 403. A current rectified by the rectifier circuit 404 charges the electric double layer capacitor 410. Incidentally, while the rectifier circuit 404 in the example of FIG. 4 is a half-wave rectifier circuit, it is needless to say that the rectifier circuit 404 may be a full-wave rectifier circuit. In addition, a power supply for the control circuit 400 constituted by the IC may of course be a battery, rather than the storage means, such as the electric double layer capacitor 410 in the present example.

In the present example, a switch circuit 405 set in an open state at normal times (normally open) is provided between the parallel resonance circuit 40R and the rectifier circuit 404. The switch circuit 405 is formed by a semiconductor switch circuit, for example. The switch circuit 405 has a high impedance in the open state.

The switch circuit 405 is controlled to be on by a switch control signal from a switch control circuit 406. The switch control circuit 406 generates the switch control signal from the alternating-current signal received in the parallel resonance circuit 40R from the position detecting device 200 by electromagnetic coupling.

In addition, in the electronic circuit 40, a switch circuit 407 is connected in parallel with the parallel resonance circuit 40R that includes the coil 162 and the capacitor 401. The switch circuit 407 is configured to be on-off controlled by the control circuit 400. Incidentally, as a synchronizing signal for transmission and reception of an electromagnetic induction signal to and from the position detecting device 200, the electromagnetic induction signal transmitted from the position detecting device 200 is supplied to the control circuit 400 via a capacitor 408.

In the present embodiment, as indicated in FIG. 4, a variable capacitor 150C formed by the pen pressure detecting portion 150 is connected to the control circuit 400. A resistance R is connected in parallel with the variable capacitor 150C. In the present example, the control circuit 400 charges the variable capacitor 150C, thereafter makes the variable capacitor 150C discharge through the resistance R, and measures a time taken for the voltage of a terminal to which the variable capacitor 150C is connected (which voltage corresponds to a voltage across the variable capacitor 150C) to reach a predetermined threshold value. The control circuit 400 thereby measures each capacitance of the variable capacitor 150C.

Then, the control circuit 400 detects a change in pen pressure from a change in the measured capacitance of the variable capacitor 150C, and thus detects whether a pen pressure is applied to the first core body 102 or the second core body 103. In addition, when detecting that a pen pressure is applied, the control circuit 400 calculates the pen pressure value of the pen pressure from the value of the capacitance of the variable capacitor 150C.

Then, in the present embodiment, the control circuit 400 transmits information about the calculated pen pressure value (pen pressure data) as a digital signal of a plurality of bits to the position detecting device 200 by performing on-off control of the switch circuit 407. In the present embodiment, the pen pressure data constitutes part of additional information.

In addition, in the present example, the control circuit 400 is connected with an ID memory 409 that stores identification information (ID) including a manufacturer number and a product number of the position indicator 100, identification information for identifying the first core body 102 (ballpoint pen core in the present example), and identification information for identifying the second core body 103 (electronic pen core in the present example). The control circuit 400 reads the identification information stored in the ID memory 409, and transmits the identification information as a digital signal of a plurality of bits to the position detecting device 200 by performing on-off control of the switch circuit 407. In the present embodiment, the identification information also constitutes part of the additional information.

In the present embodiment, as described earlier, the control circuit 400 monitors the connection state between the contact portions 142 and 143 which connection state corresponds to the knock operation state of the knock operating portion 120 and the connection state between the contact portions 144 and 145 which connection state corresponds to the knock operation state of the knock operating portion 130. The control circuit 400 thereby determines whether the position indicator 100 is in a state in which the tip 102a of the first core body 102 projects from the opening portion 101a to the outside (first state) or a state in which the tip 103a of the second core body 103 projects from the opening portion 101a to the outside (second state) or a state in which the tips 102a and 103a of the two core bodies 102 and 103, respectively, are both housed within the casing 101 (third state).

Then, in the present example, when the pen pressure value increases to a predetermined threshold value or more from a state in which no pen pressure is applied, the control circuit 400 detects the increase, and determines that the application of a pen pressure is started.

In the present embodiment, except when the control circuit 400 transmits the additional information to the position detecting device 200, the control circuit 400 holds the switch circuit 407 in an off state, and holds the parallel resonance circuit 40R in an operating state. Then, when the control circuit 400 receives a synchronizing signal from the position detecting device 200 through the capacitor 408, the control circuit 400 determines that timing of transmission of the additional information arrives, and transmits the pen pressure data and the identification information as an amplitude shift keying (ASK) modulated signal, which will be described later, to the position detecting device 200 by performing on-off control of the switch circuit 407 in timing based on the received synchronizing signal. Incidentally, in place of ASK modulation, modulation may be performed so as to generate an on off keying (OOK) signal.

As indicated in FIG. 4, the position detecting device 200 is provided with a sensor unit 210 in which position detecting coils are formed by stacking an X-axis direction loop coil group 211X and a Y-axis direction loop coil group 212Y. The loop coil groups 211X and 212Y are, for example, constituted of n and m rectangular loop coils, respectively. The loop coils forming the respective loop coil groups 211X and 212Y are disposed so as to be arranged at equal intervals and sequentially overlap each other.

In addition, the position detecting device 200 is provided with a selecting circuit 213 to which the X-axis direction loop coil group 211X and the Y-axis direction loop coil group 212Y are connected. The selecting circuit 213 sequentially selects one loop coil of the two loop coil groups 211X and 212Y.

The position detecting device 200 further includes an oscillator 221, a current driver 222, a switching connecting circuit 223, a receiving amplifier 224, a detector 225, a low-pass filter 226, a sample and hold circuit 227, an analog to digital (A/D) converter circuit 228, and a processing control unit 229. The processing control unit 229 is formed by a microcomputer, for example.

The oscillator 221 generates an alternating-current signal of a frequency f0. The resonance frequency of the resonance circuit 40R in the position indicator 100 is selected such that the frequency f0 is a center frequency. The alternating-current signal generated in the oscillator 221 is supplied to the current driver 222. The current driver 222 converts the alternating-current signal supplied from the oscillator 221 into a current, and sends out the current to the switching connecting circuit 223. The switching connecting circuit 223 selects a connection destination (a transmitting side terminal T or a receiving side terminal R) to which to connect the loop coil selected by the selecting circuit 213, under control of the processing control unit 229. Of the connection destinations, the transmitting side terminal T is connected with the current driver 222, and the receiving side terminal R is connected with the receiving amplifier 224.

An induced voltage generated in the loop coil selected by the selecting circuit 213 is sent to the receiving amplifier 224 via the selecting circuit 213 and the switching connecting circuit 223. The receiving amplifier 224 amplifies the induced voltage supplied from the loop coil, and sends out the amplified induced voltage to the detector 225.

The detector 225 detects the induced voltage generated in the loop coil, that is, a received signal, and sends out the received signal to the low-pass filter 226. The low-pass filter 226 has a cutoff frequency sufficiently lower than the above-mentioned frequency f0. The low-pass filter 226 converts the output signal of the detector 225 into a direct-current signal, and sends out the direct-current signal to the sample and hold circuit 227. The sample and hold circuit 227 holds a voltage value of the output signal of the low-pass filter 226 in predetermined timing, specifically predetermined timing during a reception period, and sends out the voltage value to the A/D converter circuit 228. The A/D converter circuit 228 converts the analog output of the sample and hold circuit 227 into a digital signal, and outputs the digital signal to the processing control unit 229.

The processing control unit 229 controls the selection of a loop coil in the selecting circuit 213, the switching of the switching connecting circuit 223, and the timing of the sample and hold circuit 227. The processing control unit 229 makes an electromagnetic induction signal transmitted from the X-axis direction loop coil group 211X and the Y-axis direction loop coil group 212Y for a certain transmission duration on the basis of the input signal from the A/D converter circuit 228.

An electromagnetic induction signal transmitted from the position indicator 100 generates an induced voltage in each of the loop coils of the X-axis direction loop coil group 211X and the Y-axis direction loop coil group 212Y. The processing control unit 229 calculates the coordinate values of an indicated position in an X-axis direction and a Y-axis direction which position is indicated by the position indicator 100 on the basis of the level of the voltage value of the induced voltage generated in each loop coil.

In addition, the processing control unit 229 supplies the current driver 222 with a signal for controlling interruption of a transmission signal and a signal for controlling the level of the transmission signal, and performs processing of receiving the additional information, such as the pen pressure data and the identification information or the like, from the position indicator 100. As will be described later, the processing control unit 229 detects an intermittent signal constituted by an ASK signal from the position indicator 100 as a digital signal of a plurality of bits, and thereby detects the additional information such as the pen pressure data and the identification information or the like.

Operation of Position Indicator 100 and Operation of Position Detecting Device 200

The following description will be made of position detecting operation and transmission and reception of the additional information between the position indicator 100 and the position detecting device 200.

The position detecting device 200 sends out an alternating-current signal of a transmission signal on the basis of processing control of the processing control unit 229. When the position indicator 100 is not in a state of receiving an alternating-current signal from the position detecting device 200 or a charging device by the parallel resonance circuit 40R, the switch circuit 405 is off, and therefore the electric double layer capacitor 410 is not charged. When the position indicator 100 is then in a state of receiving an alternating-current signal from the position detecting device 200 or the charging device by the parallel resonance circuit 40R, the switch circuit 405 is on, and, therefore, the electric double layer capacitor 410 is charged (electricity is stored).

Specifically, the switch control circuit 406 of the electronic circuit 40 of the position indicator 100 generates a switch control signal for turning on the switch circuit 405 from the alternating-current signal received by the parallel resonance circuit 40R from the sensor unit 210 of the position detecting device 200. When the switch circuit 405 is thereby turned on, the rectifier circuit 404 rectifies the alternating-current signal received by the parallel resonance circuit 40R, and charges the electric double layer capacitor 410 (electricity is stored).

The resonance circuit 40R of the position indicator 100 is normally in an operating state. Thus, when the position indicator 100 approaches the sensor unit 210 of the position detecting device 200, the resonance circuit 40R of the position indicator 100 is electromagnetically coupled to the sensor unit 210 of the position detecting device 200. Then, the resonance circuit 40R receives the alternating-current signal transmitted from the position detecting device 200, and the position indicator 100 performs processing of feeding back a signal responding to the received signal from the resonance circuit 40R to the position detecting device 200 in a receiving state. In the present embodiment, the position detecting device 200 can detect the position indicator 100 even in a so-called hovering state in which the position indicator 100 is not in contact with the sensor unit 210.

The position detecting device 200 in the present example checks the feedback signal from the position indicator 100, and thereafter transmits a synchronizing signal that notifies timing of transmission of additional information from the sensor unit 210 to the position indicator 100.

The control circuit 400 is driven by a power supply voltage Vcc from the electric double layer capacitor 410, and transmits the additional information according to the received synchronizing signal. In this case, in the third state in which neither of the tips 102a and 103a of the first core body 102 and the second core body 103 projects from the opening portion 101a to the outside, the pen pressure detecting portion 150 detects no pen pressure, and therefore the control circuit 400 sends out zero as information about the pen pressure value and transmits the identification information (ID) of the position indicator 100 itself and information indicating that neither of the tips 102a and 103a of the core body 102 and the core body 103 projects from the opening portion 101a to the outside.

Then, when the knock operating portion 120 of the position indicator 100 is operated to effect a state in which the tip 102a of the first core body 102 projects from the opening portion 101a to the outside (first state), the protruding portion 124 of the knock operating portion 120 engages with the recessed portion 159b of the pressure transmitting member 159 of the pen pressure detecting portion 150 disposed in the stopper 141, and is, thus, set in a state of transmitting a pen pressure applied to the tip 102a of the first core body 102 to the pressure transmitting member 159.

The control circuit 400 determines that the tip 102a of the first core body 102 projects from the opening portion 101a to the outside on the basis of a change of the contact portions 142 and 143 from a connected state to a disconnected state, and reads the identification information of the first core body 102 from the ID memory 409. The control circuit 400 then transmits information about a pen pressure value detected by the pen pressure detecting portion 150 at this time and the identification information of the first core body 102 as additional information to the position detecting device 200.

In addition, in the position indicator 100, when the knock operating portion 130 is operated to effect a state in which the tip 103a of the second core body 103 projects from the opening portion 101a to the outside, the protruding portion 134 of the knock operating portion 130 engages with the recessed portion 159b of the pressure transmitting member 159 of the pen pressure detecting portion 150 disposed in the stopper 141, and is, thus, set in a state of transmitting a pen pressure applied to the tip 103a of the second core body 103 to the pressure transmitting member 159.

The control circuit 400 determines that the tip 103a of the second core body 103 projects from the opening portion 101a to the outside on the basis of a change of the contact portions 144 and 145 from a connected state to a disconnected state, and reads the identification information of the second core body 103 from the ID memory 409. The control circuit 400 then transmits information about a pen pressure value detected by the pen pressure detecting portion 150 at this time and the identification information of the second core body 103 as additional information to the position detecting device 200.

Figure 5:
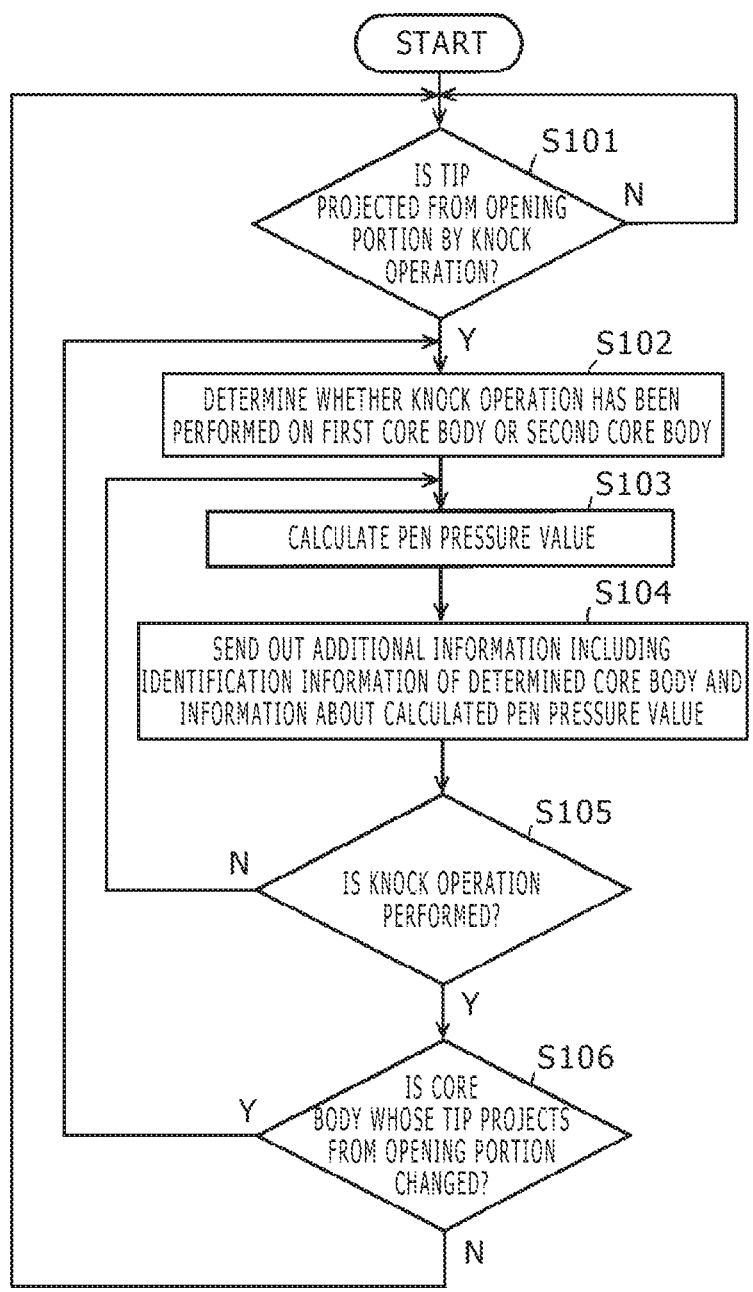
FIG. 5 is a diagram indicating a flowchart of assistance in explaining an example of operation of the first embodiment of the position indicator according to the present invention.

FIG. 5 is a flowchart of assistance in explaining processing operation of the control circuit 400 in the electronic circuit 40 of the position indicator 100.

The control circuit 400 monitors the connection state between the contact portions 142 and 143 and the connection state between the contact portions 144 and 145, and determines whether or not either the tip 102a of the first core body 102 or the tip 103a of the second core body 103 projects from the opening portion 101a to the outside (step S101).

When determining in this step S101 that the position indicator 100 is in the third state in which neither the tip 102a of the first core body 102 nor the tip 103a of the second core body 103 projects from the opening portion 101a to the outside, the control circuit 400 returns the processing to step S101 to repeat this step S101. Incidentally, the resonance circuit 40R in the position indicator 100 operates also at this time. Thus, when the position indicator 100 approaches the sensor unit 210 of the position detecting device 200, the sensor unit 210 and the resonance circuit 40R exchange alternating-current signals by electromagnetic coupling.

When next determining in step S101 that either the tip 102a of the first core body 102 or the tip 103a of the second core body 103 projects from the opening portion 101a to the outside, the control circuit 400 determines which of the tip 102a of the first core body 102 and the tip 103a of the second core body 103 projects from the opening portion 101a to the outside, from the connection state between the contact portions 142 and 143 and the connection state between the contact portions 144 and 145 (step S102).

The position indicator 100 operates to receive an alternating-current signal from the sensor 210 of the position detecting device 200 by the resonance circuit 40R, and feed back the received signal to the sensor of the position detecting device 200. The position detecting device 200 detects a position indicated by the position indicator 100 by detecting the position of a loop coil that receives the feedback signal from the position indicator 100. Then, when timing of reception of the additional information from the position indicator 100 arrives, the position detecting device 200 sends a synchronizing signal to the position indicator 100, as described earlier.

Meanwhile, the control circuit 400 calculates the value of a pen pressure applied to the projecting tip from the capacitance of the variable capacitor 150C formed by the pen pressure detecting portion 150 at a given time (step S103). In addition, the control circuit 400 reads, from the ID memory 409, the identification information of the core body whose tip is determined to project from the opening portion 101a to the outside in step S102 and the identification information of the position indicator 100 itself. The control circuit 400 then generates additional information constituted of the read identification information and information about the pen pressure value calculated in step S103. The control circuit 400 then transmits the generated additional information to the position detecting device 200 in synchronism with the synchronizing signal from the position detecting device 200 (step S104).

In this case, the control circuit 400 transmits the generated additional information from the position indicator 100 to the position detecting device 200 by performing on-off control of the switch circuit 407 according to the digital value of the generated additional information. Specifically, when the switch circuit 407 is off, the parallel resonance circuit 40R can perform resonant operation on the alternating-current signal transmitted from the position detecting device 200, and return an electromagnetic induction signal to the position detecting device 200. The loop coils of the sensor unit 210 of the position detecting device 200 receive the electromagnetic induction signal from the resonance circuit 40R of the position indicator 100. On the other hand, when the switch circuit 407 is on, the parallel resonance circuit 40R is prohibited from performing the resonant operation on the alternating-current signal from the position detecting device 200. Therefore, the electromagnetic induction signal is not returned from the parallel resonance circuit 40R to the position detecting device 200, and the loop coils of the position detecting device 200 do not receive the signal from the position indicator 100.

In the present example, the processing control unit 229 of the position detecting device 200 detects the presence or absence of the received signal from the position indicator 100 the number of times which number is equal to the number of bits of the additional information. The processing control unit 229 thereby receives the additional information of a digital signal of the plurality of bits.

On the other hand, the control circuit 400 of the position indicator 100 generates the digital signal of the plurality of bits corresponding to the additional information to be transmitted. On the basis of the digital signal of the plurality of bits, the control circuit 400 performs on-off control of the switch circuit 407 in synchronism with the transmission and reception of electromagnetic induction signals to and from the position detecting device 200. For example, when a bit of the additional information is "0," the switch circuit 407 is turned on. Then, as described earlier, no electromagnetic induction signal is returned from the position indicator 100 to the position detecting device 200. On the other hand, when a bit of the additional information is "1," the switch circuit 407 is turned off. Then, as described earlier, an electromagnetic induction signal is returned from the position indicator 100 to the position detecting device 200.

Hence, the processing control unit 229 of the position detecting device 200 can receive the additional information as the digital signal by detecting the presence or absence of the received signal from the position indicator 100 the number of times which number is equal to the number of bits of the additional information.

Next, the control circuit 400 determines whether or not a knock operation is performed on the basis of whether or not at least one of the connection state between the contact portions 142 and 143 and the connection state between the contact portions 144 and 145 has changed (step S105). When neither the connection state between the contact portions 142 and 143 nor the connection state between the contact portions 144 and 145 has changed, and, therefore, the control circuit 400 determines that knock operation is not performed, the control circuit 400 returns the processing to step S103 to repeat the processing from step S103 on down.

When determining in step S105 that at least one of the connection state between the contact portions 142 and 143 and the connection state between the contact portions 144 and 145 has changed, the control circuit 400 determines whether or not the core body whose tip projects from the opening portion 101*a* to the outside has changed (step S106). When determining in step S106 that the core body whose tip projects from the opening portion 101*a* to the outside has changed, the control circuit 400 returns the processing to step S102 to repeat the processing from step S102 on down.

When determining in step S106 that the position indicator 100 is set in the third state in which neither the tip 102*a* of the first core body 102 nor the tip 103*a* of the second core body 103 projects from the opening portion 101*a* to the outside, the control circuit 400 returns the processing to step S101 to repeat the processing from step S101 on down.

When the position indicator 100 according to the above-described embodiment is in a state in which the tip 102*a* of the ballpoint pen core as the first core body 102 is projected, and drawing is performed with the ballpoint pen core as the first core body 102 on paper placed on the sensor of the position detecting device, the position detecting device 200 can detect the drawing trajectory of the ballpoint pen core as a result of detection of indicated positions. It is therefore possible to perform drawing on paper and obtain the electronic data of information about the drawing (indicated position data) at the same time.

In addition, in a case where a display screen is disposed so as to be superposed on the sensor of the position detecting device 200, when the electronic pen core formed of resin in the present example as the second core body 103 is set in a projected state, the tip of the core body can be brought into contact with the display screen without any problem, and indication input can be performed by the position indicator 100.

In the position indicator 100 according to the above-described embodiment, the pen pressure detecting portion 150 is shared between the first core body 102 and the second core body 103. Thus, the position indicator 100 can be manufactured inexpensively as compared with the case where a pen pressure detecting portion is provided for each of a plurality of core bodies. Furthermore, in the position indicator 100 according to the above-described embodiment, the core bodies do not need to have the constitution of a cartridge including a pen pressure detecting portion and a circuit part, but the ballpoint pen core and the electronic pen core formed of resin can be used as they are. Therefore, the position indicator 100 according to the above-described embodiment can be configured even more inexpensively in terms of cost, and costs for replacing the core bodies are also reduced.

Modifications of Foregoing Embodiment

In the foregoing embodiment, the first core body 102 is a ballpoint pen core, and the second core body 103 is an electronic pen core. However, the first core body and the second core body may be any core body. For example, the first core body 102 and the second core body 103 may both be a ballpoint pen core. In that case, the ballpoint pen core of the first core body 102 can be filled with black ink, and the ballpoint pen core of the second core body can be filled with red ink. Because the position detecting device can receive the identification information of the first core body 102 and the second core body 103, the position detecting device can recognize drawing colors for electronic data of drawing information (indicated position data) of the respective ballpoint pen cores on the basis of the identification information, and include the drawing colors in the electronic data.

In addition, the first core body 102 and the second core body 103 may both be an electronic pen core. In that case, the position detecting device can distinguish functions such as display colors, line types, line thicknesses, and the like assigned to the electronic pen core of the first core body 102 and the electronic pen core of the second core 103 body by receiving the identification information of the first core body 102 and the second core body 103 as additional information from the position indicator 100.

In addition, the detection of which of the tips of the first core body and the second core body projects from the opening portion 101*a* to the outside is not limited to the method described in the foregoing embodiment. For example, a sensor member that detects the sliding movement of the first core body and the second core body may be disposed in the part of the core body holder 104.

It is to be noted that the transmission of the identification information of the first core body and the second core body as additional information to the position detecting device is not an essential requirement for the position indicator according to one or more embodiments of the present invention. As in the foregoing embodiment, that is, as in the case where the first core body 102 is a ballpoint pen core and the second core body 103 is an electronic pen core, there may be cases where uses are limited and it is not necessary on the position detecting device side to recognize which of the tips of the core bodies projects.

In addition, in the foregoing embodiment, the protruding portions 124 and 134 of the knock operating portions 120 and 130 are engaged with the recessed portion 159*b* of the pressure transmitting member 159, and thereby the pen pressure detecting portion 150 engages on the opposite side of the knock operating portions 120 and 130 from the tips of the core bodies. However, the constitution in which the knock operating portions 120 and 130 engage with the pen pressure detecting portion 150 on the opposite side from the tips of the core bodies is not limited to this. For example, the constitution in which the core bodies 102 and 103 are coupled to the knock operating portions 120 and 130 may be a constitution such that the core bodies 102 and 103 are made to penetrate the projecting portions 121 and 131 of the knock operating portions 120 and 130 in the axial direction and are coupled in a state in which the end portions of the core bodies 102 and 103 project, and the projecting end portions of the core bodies 102 and 103 may be configured to engage with the recessed portion of the pressure transmitting member 159.

Second Embodiment

In the foregoing first embodiment, information about a pen pressure value detected by the pen pressure detecting portion 150 is transmitted to the position detecting device 200 as additional information by an ASK signal. However, information about a pen pressure value can also be transmitted to the position detecting device 200 as a shift in resonance frequency (or a phase shift) of the parallel resonance circuit 40R. A position indicator 100A according to a second embodiment to be described in the following is thus configured.

A mechanical constitution (hardware configuration) of the position indicator 100A according to the second embodiment is exactly similar to that of the first embodiment indicated in FIGS. 1 to 3. A configuration of an electronic circuit 40A in the position indicator 100A according to the second embodiment is different from that of the electronic circuit 40 in the position indicator 100 according to the first embodiment. In addition, methods of receiving and detecting information about a pen pressure value and identification information by a position detecting device 200A used in conjunction with the position indicator 100A according to the second embodiment are different from those of the position detecting device 200 in the case of the first embodiment.

Figure 6:
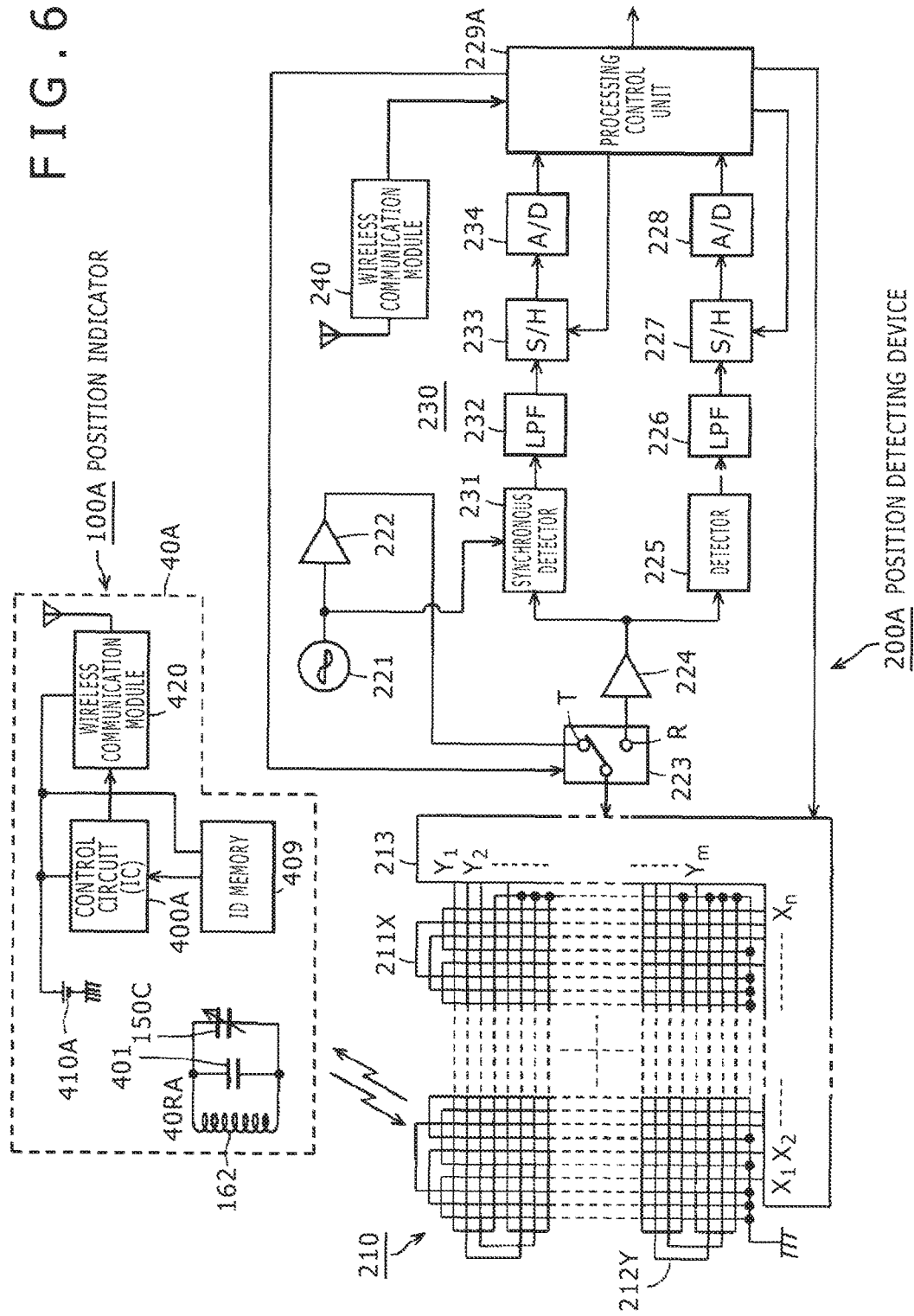
FIG. 6 is a block diagram indicating an example of configuration of an electronic circuit of a second embodiment of the position indicator according to the present invention together with an example of circuit configuration of a corresponding position detecting device.

FIG. 6 indicates an example of configuration of the electronic circuit 40A of the position indicator 100A according to the second embodiment and an example of configuration of an electronic circuit of the position detecting device 200A. In FIG. 6, the same parts as in the position indicator 100 and the position detecting device 200 according to the first embodiment are identified by the same reference symbols, and detailed description thereof will be omitted.

In the electronic circuit 40A of the position indicator 100A according to the second embodiment, as with a capacitor 401, a variable capacitor 150C formed by a pen pressure detecting portion 150 is connected in parallel with a coil 162 to form a parallel resonance circuit 40RA. The position indicator 100A according to the second embodiment receives a signal from the position detecting device 200A by electromagnetic coupling between a sensor unit 210 of the position detecting device 200A and the parallel resonance circuit 40RA, and transmits a signal responding to the received signal and corresponding to the resonance frequency of the parallel resonance circuit 40RA to the position detecting device 200A.

In the position indicator 100A according to the second embodiment, a control circuit 400A is driven by a battery 410A, and a wireless communication module 420 based on the Bluetooth (registered trademark) standard, for example, is provided. As in the first embodiment, the control circuit 400A determines whether a core body whose tip projects from an opening portion 101a to the outside is a first core body 102 or a second core body 103, though not indicated in FIG. 6.

Then, the control circuit 400A reads the identification information of the position indicator 100A and the identification information of the core body whose tip projects from the opening portion 101a to the outside from an ID memory 409, and transmits the identification information to the position detecting device 200A through the wireless communication module 420. The position detecting device 200A includes a wireless communication module 240 for receiving additional information from the position indicator 100A by performing wireless communication with the wireless communication module 420 of the position indicator 100A.

The position detecting device 200A detects a position indicated by the position indicator 100A by detecting which loop coil has received a feedback signal from the position indicator 100A as in the case of the first embodiment, and detects the value of a pen pressure detected by the pen pressure detecting portion 150 by detecting a shift in frequency (shift in phase) of the received signal from the position indicator 100A with respect to a transmission signal. Therefore, as indicated in FIG. 6, in addition to the configuration of the position detecting device 200 according to the first embodiment, the position detecting device 200A includes a circuit 230 that detects a shift in frequency (shift in phase) of the received signal from the position indicator 100A with respect to the transmission signal in order to detect the pen pressure value from the signal received from the position indicator 100A.

The circuit 230 includes a synchronous detector 231, a low-pass filter 232, a sample and hold circuit 233, and an A/D converter circuit 234. An oscillator 221 supplies a generated alternating-current signal to a current driver 222 and the synchronous detector 231. A receiving amplifier 224 amplifies an induced voltage supplied from a loop coil, and sends out the amplified induced voltage to a detector 225 and the synchronous detector 231.

As in the case of the position detecting device 200 according to the first embodiment, the received signal from the position indicator 100A is detected by the detector 225, and thereafter supplied to a sample and hold circuit 227 through a low-pass filter 226. Then, the output of the sample and hold circuit 227 is converted into a digital signal by an A/D converter circuit 228. The digital signal is supplied to a processing control unit 229A. As in the case of the position detecting device 200 according to the first embodiment, the processing control unit 229A detects a position indicated by the position indicator 100A.

Meanwhile, the synchronous detector 231 of the circuit 230 performs synchronous detection of the output signal of the receiving amplifier 224 by the alternating-current signal from the oscillator 221, and sends out, to the low-pass filter 232, a signal having a level corresponding to a phase difference between these signals. This low-pass filter 232 has a cutoff frequency sufficiently lower than a frequency f0. The low-pass filter 232 converts the output signal of the synchronous detector 231 into a direct-current signal, and sends out the direct-current signal to the sample and hold circuit 233. The sample and hold circuit 233 holds a voltage value of the output signal of the low-pass filter 232 in predetermined timing, and sends out the voltage value to the A/D converter circuit 234. The A/D converter circuit 234 converts the analog output of the sample and hold circuit 233 into a digital signal, and outputs the digital signal to the processing control unit 229A. The processing control unit 229A receives the output of the A/D converter circuit 234, which output is an output signal of the circuit 230, and detects a pen pressure value on the basis of the level of the signal corresponding to a frequency difference (phase difference) between the transmitted radio wave and the received radio wave.

Thus, in the position detecting device 200A, the processing control unit 229A detects the position of the position indicator 100A on the sensor unit 210, and obtains information about the pen pressure value of the position indicator 100A by detecting the frequency difference (phase difference) between the frequency of the transmitted signal and the frequency of the received signal.

The identification information of the core body to which a pen pressure is applied and the identification information of the position indicator 200A itself are transmitted to the position detecting device 200A through the wireless communication module 420 on the basis of control of the control circuit 400A, and are received by the wireless communication module 240. The wireless communication module 240 supplies the received signal to the processing control unit 229A. The processing control unit 229A reconstructs the identification information from the received signal, and detects whether the core body of the position indicator 100A to which core body the pen pressure detected is applied and which core body indicates a position on the sensor unit 210 is the first core body 102 or the second core body 103.

Incidentally, as in the first embodiment, in a case where the first core body 102 is a ballpoint pen core and the second core body 103 is an electronic pen core formed of resin, for example, it may not be necessary to distinguish the first core body 102 and the second core body 103 from each other, as described earlier. In such a case, the identification information does not need to be transmitted to the position detecting device 200A, and therefore the position indicator 100A does not need to be provided with any of the battery 410A, the control circuit 400A, the ID memory 409, and the wireless communication module 420.

Third Embodiment

Electromagnetic induction type position indicators have been described in the foregoing embodiments. However, one or more embodiments of the present invention is applicable to also a position indicator of a so-called active capacitive type, which position indicator includes a signal transmitting circuit. In that case, a resonance circuit formed by a coil 162 wound around a ferrite core 161 and a capacitor 401 provided on a printed board 140 constitutes part of an electromagnetic induction type charging circuit, and the signal transmitting circuit is driven by a power supply voltage from a rechargeable battery.

A third embodiment represents a case where the present invention is applied to this active capacitive type position indicator. An example of mechanical constitution (hardware configuration) of a position indicator 100B according to the third embodiment is different in that a plurality of core bodies are a first core body 102B and a second core body 103B that are formed by a conductive member and in that there are constituent parts for supplying a signal from a signal transmitting circuit to the first core body 102B and the second core body 103B that have conductivity. However, the position indicator 100B according to the third embodiment is otherwise similar to the mechanical constitution (hardware configuration) of the position indicator 100 of the first embodiment indicated in FIGS. 1 to 3.

Figure 7:
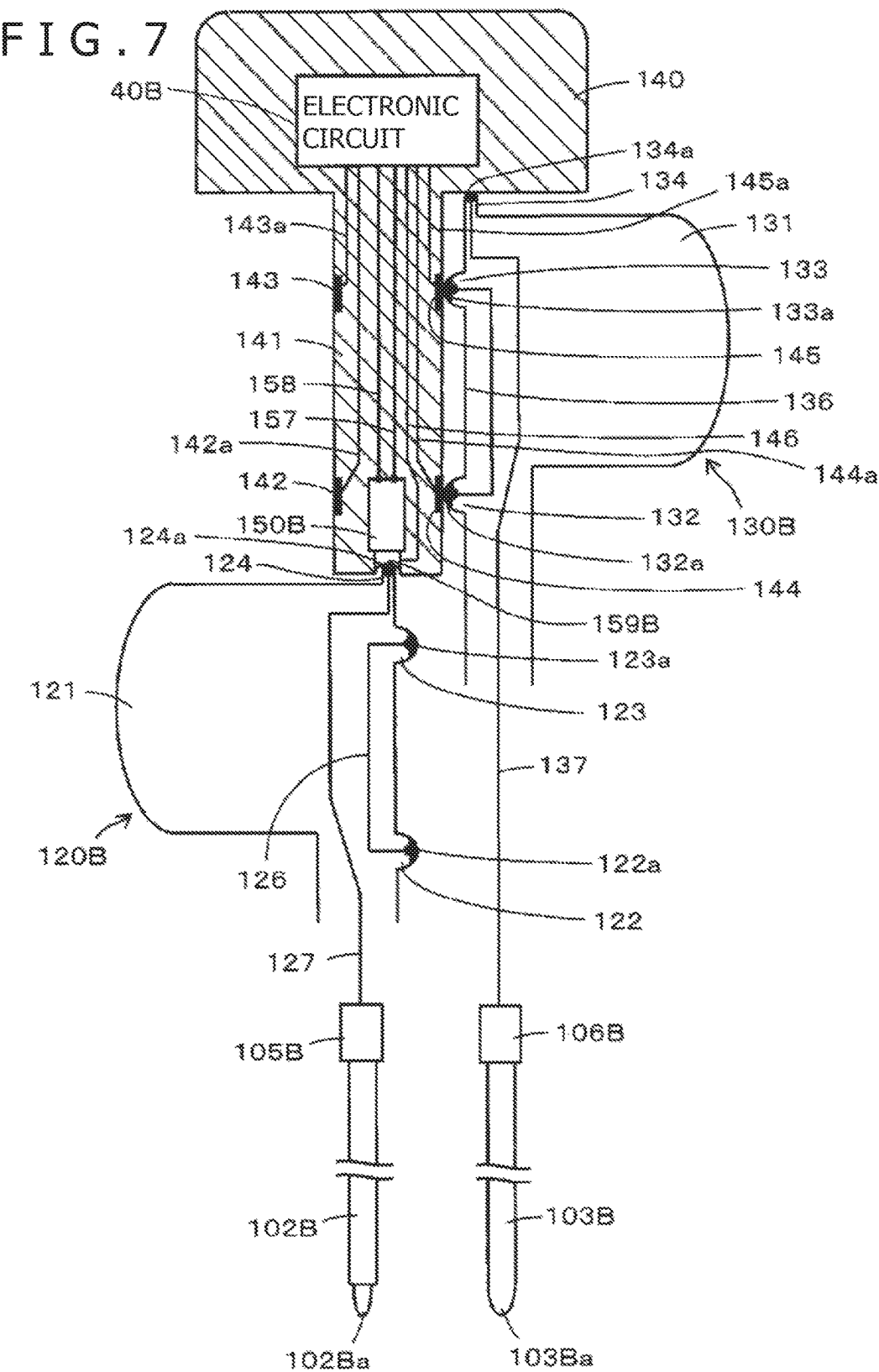
FIG. 7 is a diagram of assistance in explaining parts in an example of mechanical constitution of a third embodiment of the position indicator according to the present invention.
Figure 8:
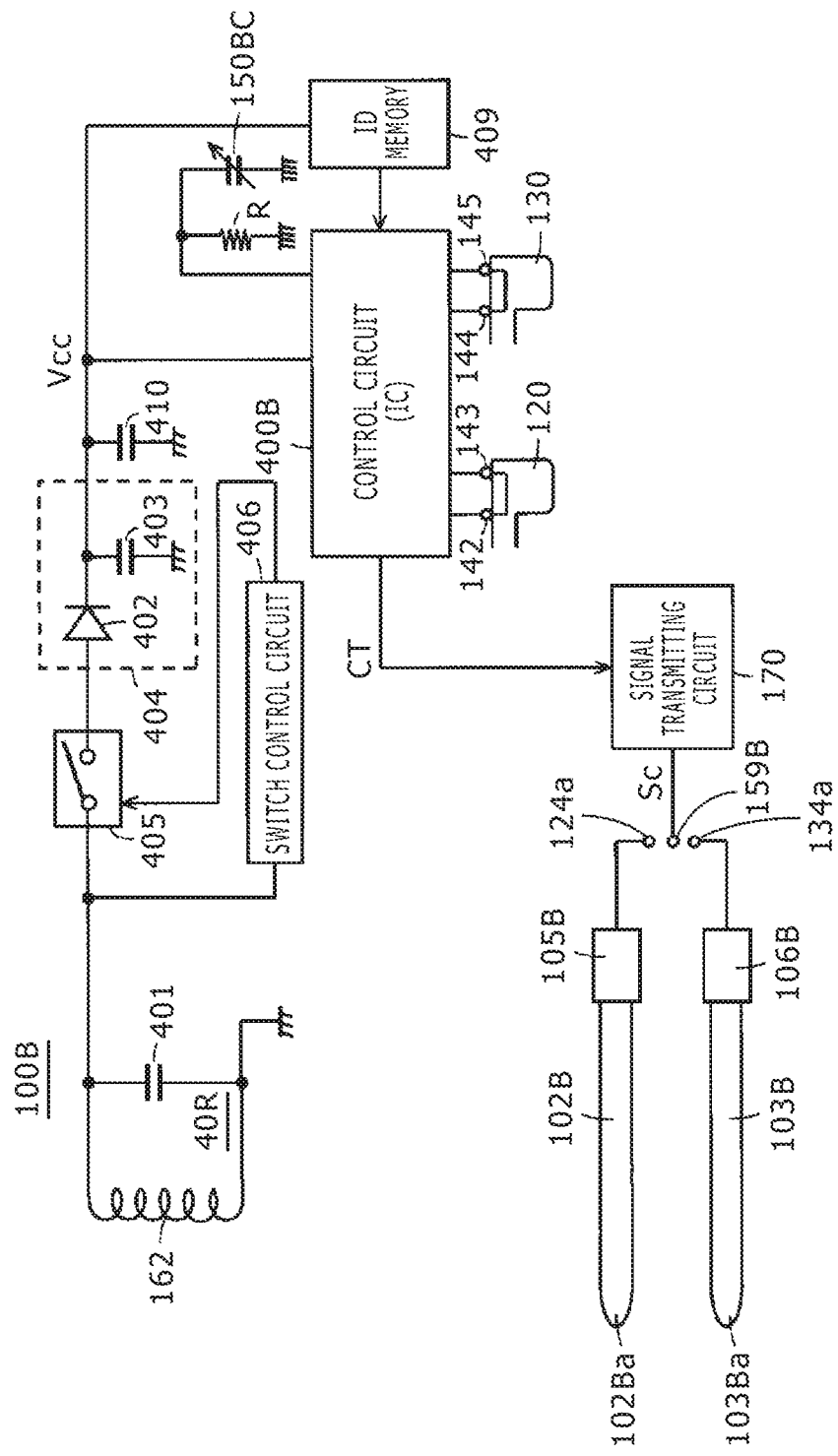
FIG. 8 is a block diagram indicating an example of configuration of an electronic circuit of the third embodiment of the position indicator according to the present invention.

FIG. 7 is a diagram of assistance in explaining a constitution of parts of the position indicator 100B according to the third embodiment which parts are different from those of the position indicator 100 according to the first embodiment. FIG. 8 is a diagram of assistance in explaining an example of configuration of an electronic circuit section of the position indicator 100B according to the third embodiment.

In FIGS. 7 and 8, the same parts as in FIGS. 1 to 3 of the foregoing embodiment are identified by the same reference symbols, and description thereof will be omitted.

As indicated in FIG. 7, in the position indicator 100B according to the third embodiment, as in the position indicator 100 according to the first embodiment, a pen pressure detecting portion 150B is disposed within a stopper 141 of a locking member 140, and an electronic circuit 40B is disposed within a part of a cap portion of the locking member 140.

In the third embodiment, a pressure transmitting member 159B of the pen pressure detecting portion 150B is formed by a member having conductivity, for example a resin made to have conductivity by mixing conductor powder therein. The pressure transmitting member 159B may of course be a conductive metal, for example. The pressure transmitting member 159B having conductivity is connected to an output terminal of a signal transmitting circuit of the electronic circuit 40B through a conductor 146. The other constitution of the pen pressure detecting portion 150B is similar to that of the pen pressure detecting portion 150 according to the foregoing embodiment.

In addition, at least tip portion 124a of protruding portion 124 of a first knock operating portion 120B and tip portion 134a of protruding portion 134 of a second knock operating portion 130B in the third embodiment are formed of a conductive material, for example, a conductive metal. Incidentally, at least the tip portions 124a and 134a of the protruding portions 124 and 134, respectively, may be formed so as to have conductivity by including, for example, conductor powder in a resin.

Further, a fitting coupling portion 105B provided to the knock operating portion 120B to which fitting coupling portion the first core body 102B is fitted and coupled and a fitting coupling portion 106B provided to the second core body 103B to which the knock operating portion 130B is fitted and coupled are also formed of a material having conductivity, for example, a conductive metal or a resin made to have conductivity by including conductor powder therein.

The conductive tip portion 124a of the protruding portion 124 of the first knock operating portion 120B and the conductive tip portion 134a of the protruding portion 134 of the second knock operating portion 130B are electrically connected to the fitting coupling portion 105B by conductor 127 and the fitting coupling portion 106B by conductor 137, respectively. Hence, when the conductive first core body 102B is fitted to the fitting coupling portion 105B, the conductive tip portion 124a of the protruding portion 124 of the first knock operating portion 120B and the conductive first core body 102B are electrically connected to each other. Similarly, when the conductive second core body 103B is fitted to the fitting coupling portion 106B, the conductive tip portion 134a of the protruding portion 134 of the second knock operating portion 130B and the conductive second core body 103B are electrically connected to each other.

With the constitution as described above, when the first knock operating portion 120B is slidingly moved to a pen tip side to make a tip 102Ba of the first core body 102B project from an opening portion 101a to the outside and to engage the tip 124a of the protruding portion 124 of the operating portion 120B with the pressure transmitting member 159B of the pen pressure detecting portion 150B, the output terminal of the signal transmitting circuit of the electronic circuit 40B and the first core body 102B are electrically connected to each other. Hence, in this state, a signal from the signal transmitting circuit of the electronic circuit 40B is transmitted through the first core body 102B. In addition, a pen pressure applied to the tip 102Ba of the first core body 102B is detected from the capacitance of a variable capacitor constituting the pen pressure detecting portion 150B, and the value of the detected pen pressure is transmitted in a state of being included in the signal from the signal transmitting circuit. In addition, the identification information of the position indicator 100B and the identification information of the first core body 102B whose tip 102Ba projects from the opening portion 101a to the outside are also transmitted in a state of being included in the signal from the signal transmitting circuit.

Similarly, when the second knock operating portion 130B is slidingly moved to the pen tip side to make a tip 103Ba of the second core body 103B project from the opening portion 101a to the outside and to engage the tip 134a of the protruding portion 134 of the operating portion 130B with the pressure transmitting member 159B of the pen pressure detecting portion 150B, the output terminal of the signal transmitting circuit of the electronic circuit 40B and the second core body 103B are electrically connected to each other. Hence, in this state, the signal from the signal transmitting circuit of the electronic circuit 40B is transmitted through the second core body 103B. In addition, a pen pressure applied to the tip 103Ba of the second core body 103B is detected from the capacitance of the variable capacitor constituting the pen pressure detecting portion 150B, and the value of the detected pen pressure is transmitted in a state of being included in the signal from the signal transmitting circuit. In addition, the identification information of the position indicator 100B and the identification information of the second core body 103B whose tip 103Ba projects from the opening portion 101a to the outside are also transmitted in a state of being included in the signal from the signal transmitting circuit.

Figure 9:
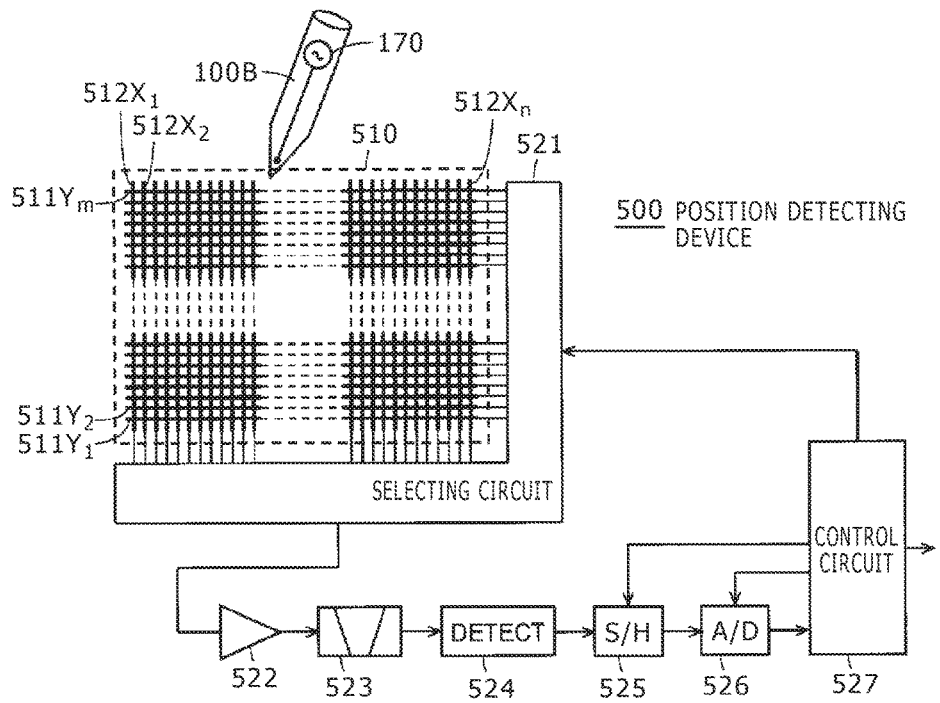
FIG. 9 is a block diagram indicating an example of circuit configuration of a position detecting device used in conjunction with the third embodiment of the position indicator according to the present invention.

FIG. 8 is a diagram indicating an example of circuit configuration of the electronic circuit 40B of the active capacitive type position indicator 100B according to the third embodiment. FIG. 9 is a diagram indicating the position indicator 100B according to the present embodiment and an example of circuit configuration of a position detecting device 500 used in conjunction with the position indicator 100B.

As indicated in FIG. 8, the electronic circuit 40B of the position indicator 100B according to the third embodiment includes a resonance circuit 40R, an electric double layer capacitor 410, a circuit for charging the electric double layer capacitor 410, an ID memory 409, and a control circuit 400B, and also includes a signal transmitting circuit 170 whose signal transmission is controlled by the control circuit 400B.

In the position indicator 100B according to the third embodiment, the resonance circuit 40R is used not to exchange a position detection signal and additional information with the position detecting device 500 but is used only to supply a charging current to the electric double layer capacitor 410. Therefore, the electronic circuit 40B is provided with neither the switch circuit 407 nor the capacitor 408 in the electronic circuit 40 according to the foregoing embodiment. In the electronic circuit 40B according to the present embodiment, when the resonance circuit 40R is electromagnetically coupled to an external device and receives electromagnetic energy, a switch control circuit 406 turns on a switch circuit 405, and a charging current flows to the electric double layer capacitor 410 through a rectifier circuit 404 to charge the electric double layer capacitor 410.

As in the control circuit 400 according to the foregoing embodiment, the control circuit 400B has a function of detecting a pen pressure value on the basis of the capacitance of a variable capacitor 150BC formed by the pen pressure detecting portion 150B, a function of detecting whether the first core body 102B and the second core body 103B are in the first state, the second state, or the third state as described above from a connection state between contact portions 142 and 143 and a connection state between contact portions 144 and 145, a function of reading identification information to be transmitted as additional information from the ID memory 409, and a function of generating additional information including information about the detected pen pressure value and the read identification information. The control circuit 400B in the third embodiment further has a function of controlling a signal transmitted from the signal transmitting circuit 170.

The signal transmitting circuit 170 includes an oscillating circuit (not indicated) that generates an alternating-current signal of a predetermined frequency f1, for example, Frequency f1=1.8 MHz. The control circuit 400B performs on-off control of the oscillating circuit by supplying a control signal CT to the oscillating circuit constituting the signal transmitting circuit 170. Hence, the oscillating circuit constituting the signal transmitting circuit 170 interrupts the generated alternating-current signal according to the control signal CT from the control circuit 400B. The signal transmitting circuit 170 thereby generates a signal Sc formed by an ASK modulated signal. Instead of ASK modulation, the signal generated by the signal transmitting circuit 170 may be converted into an OOK modulated signal.

Under the control of the control circuit 400B by the control signal CT, the signal transmitting circuit 170 sends out, as the ASK modulated signal, the signal Sc including a continuous transmission signal (burst signal) and additional information, the continuous transmission signal (burst signal) being not only for making the position detecting device 500 detect a position indicated by the position indicator 100B but also for enabling the position detecting device 500 to perform signal demodulation in synchronism with signal sending-out timing of the signal sent out from the position indicator 100B.

The signal Sc from the signal transmitting circuit 170 is amplified by an amplifier not indicated in the figures, and is thereafter supplied to the pressure transmitting member 159B of the pen pressure detecting portion 150B in the present embodiment, as indicated in FIG. 8. When the tip 102Ba of the first core body 102B projects from the opening portion 101a to the outside, the tip 124a of the protruding portion 124 of the first knock operating portion 120B is engaged with a recessed portion of the pressure transmitting member 159B. The tip 124a of the protruding portion 124 of the first knock operating portion 120B and the recessed portion of the pressure transmitting member 159B are thereby electrically connected to each other, so that the signal Sc is supplied to the first core body 102B through the fitting coupling portion 105B. In addition, when the tip 103Ba of the second core body 103B projects from the opening portion 101a to the outside, the tip 134a of the protruding portion 134 of the second knock operating portion 130B is engaged with the recessed portion of the pressure transmitting member 159B. The tip 134a of the protruding portion 134 of the second knock operating portion 130B and the recessed portion of the pressure transmitting member 159B are thereby electrically connected to each other, so that the signal Sc is supplied to the second core body 103B through the fitting coupling portion 106B.

A sensor 510 of the position detecting device 500 that performs signal reception by being capacitively coupled to the position indicator 100B in the present example has a constitution for detecting a position indicated by the position indicator 100B and receiving additional information by receiving the signal sent out from the position indicator 100B by using a sensor pattern formed by making a first conductor group and a second conductor group intersect each other, as indicated in FIG. 9.

The first conductor group is, for example, a plurality of first conductors $511Y_1, 511Y_2, \ldots, 511Y_m$ (m is an integer of one or more) that extend in a horizontal direction (X-axis direction) and which are arranged in a Y-axis direction so as to be separated from each other at predetermined intervals and parallel with each other.

The second conductor group is a plurality of second conductors $512X_1, 512X_2, \ldots, 512X_n$ (n is an integer of one or more) that extend in a direction intersecting the extending direction of the first conductors $511Y_1, 511Y_2, \ldots, 511Y_m$, or in a vertical direction (Y-axis direction) orthogonal to the extending direction of the first conductors $511Y_1, 511Y_2, \ldots, 511Y_m$ in the present example, and which are arranged in the X-axis direction so as to be separated from each other at predetermined intervals and parallel with each other.

The position detecting device 500 includes a selecting circuit 521 as an input-output interface with the sensor 510, an amplifier circuit 522, a band-pass filter 523, a detecting circuit 524, a sample and hold circuit 525, an A/D converter circuit 526, and a control circuit 527.

The selecting circuit 521 selects one conductor from among each of the first conductor group and the second conductor group on the basis of a control signal from the control circuit 527. The conductor selected by the selecting circuit 521 is connected to the amplifier circuit 522. A signal from the position indicator 100B is detected by the selected conductor, and is amplified by the amplifier circuit 522. The output of the amplifier circuit 522 is supplied to the band-pass filter 523, where only a component of the frequency of the signal transmitted from the position indicator 100B is extracted.

The output signal of the band-pass filter 523 is detected by the detecting circuit 524. The output signal of the detecting circuit 524 is supplied to the sample and hold circuit 525 to be sampled and held in predetermined timing according to a sampling signal from the control circuit 527, and is thereafter converted into a digital value by the A/D converter circuit 526. The digital data from the A/D converter circuit 526 is read and processed by the control circuit 527.

The control circuit 527 operates so as to send out a control signal to each of the sample and hold circuit 525, the A/D converter circuit 526, and the selecting circuit 521 according to a program stored in an internal read only memory (ROM). In addition, the control circuit 527 calculates position coordinates on the sensor 510 which position coordinates are indicated by the position indicator 100B from the digital data from the A/D converter circuit 526. In addition, additional information sent from the position indicator 100B is demodulated from the digital data from the A/D converter circuit 526.

Figure 10A:
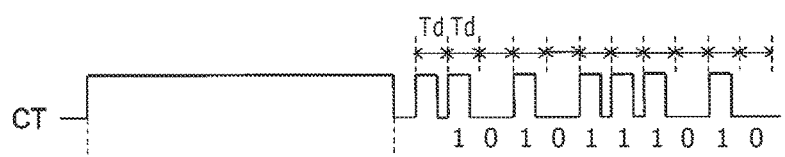
FIG. 10A is a timing diagram of a control signal from a control circuit for use in explaining operation of the third embodiment of the position indicator according to the present invention.
Figure 10B:
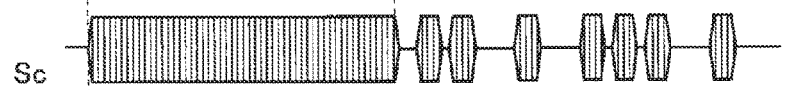
FIG. 10B is a timing diagram of a signal generated by a signal transmitting circuit for use in explaining operation of the third embodiment of the position indicator according to the present invention.
Figure 10C:
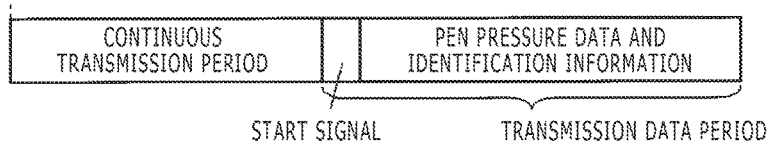
FIG. 10C is a timing diagram of a transmission period and a transmission data period for use in explaining operation of the third embodiment of the position indicator according to the present invention.

FIGS. 10A, 10B, and 10C are timing diagrams of assistance in explaining a signal of a predetermined pattern from the transmission type position indicator 100B according to the present embodiment, the signal being received by the sensor 510 of the position detecting device 500. In the position indicator 100B according to the present embodiment, the control circuit 400B controls the signal transmitting circuit 170 so as to repeatedly output the signal of the predetermined pattern including a position detection signal and additional information.

FIG. 10A indicates an example of the control signal CT from the control circuit 400B. As indicated in FIG. 10B, for a certain period of maintaining a high level, the signal Sc transmitted from the signal transmitting circuit 170 is transmitted continuously as a burst signal (continuous transmission period in FIG. 10C).

During this continuous transmission period, the control circuit 400B detects the value of a pen pressure applied to the core body whose tip projects from the opening portion 101a as a value corresponding to the capacitance of the variable capacitor 150BC formed by the pen pressure detecting member 150B by a method similar to that described for the position indicator 100 according to the foregoing embodiment, and obtains the pen pressure value as a value of a plurality of bits, for example, 10 bits (binary code).

The control circuit 400B controls the signal transmitting circuit 170 so as to sequentially transmit additional information of the plurality of bits following a start signal. The control circuit 400B repeatedly transmits the signal of the pattern constituted of the continuous transmission period and the transmission data period as described above.

As described above, according to the position indicator 100B in the present example, which position indicator is a transmission type active capacitive electronic pen of the capacitive system, in the case where one of the tips of the plurality of core bodies is selectively projected from the opening portion 101a to the outside according to a knock operation, one pen pressure detecting portion can be shared between the plurality of core bodies. Thus, cost is reduced.

The position indicator of the capacitive system according to the third embodiment described above is configured to supply a signal to the core body whose tip is projected from the opening portion 101a by an operation of slidingly moving the knock operating portion 120 or 130. That is, by merely performing an operation of selecting a core body by a knock operation, a user can make a signal sent out from only the selected core body. It is not necessary to perform another operation for making a signal sent out from the core body whose tip projects from the opening portion 101a. Therefore good usability is provided.

Incidentally, the position indicator can also be configured to support both the capacitive system and the electromagnetic induction system by providing a signal transmitting circuit similar to the signal transmitting circuit 170 within the above-described electronic circuit 40, and when detecting that the tip of a core body formed of a conductor projects from the opening portion 101a of the casing 101 to the outside, transmitting a signal from the signal transmitting circuit of the electronic circuit 40 through the conductive core body whose tip projects to the outside.

Fourth Embodiment

The position indicator according to the third embodiment is a transmission type active capacitive electronic pen of the capacitive system, and the position indicator includes an oscillating circuit. A fourth embodiment is an example in which the present invention is applied to an electronic pen of the capacitive system, and the position indicator includes no oscillating circuit but is configured to receive a signal from a position detecting device by electric field coupling and feed back the received signal to the position detecting device after applying predetermined signal processing to the received signal.

The position detecting device used in conjunction with the position indicator according to the fourth embodiment has a constitution obtained by providing the position detecting device 500 indicated in FIG. 9 with an oscillator for generating a transmission signal and a selector switch circuit configured to supply a signal from the oscillator to the selecting circuit 521 at a time of transmission and supply a signal from the selecting circuit 521 to the amplifier 522 at a time of reception.

Figure 11:
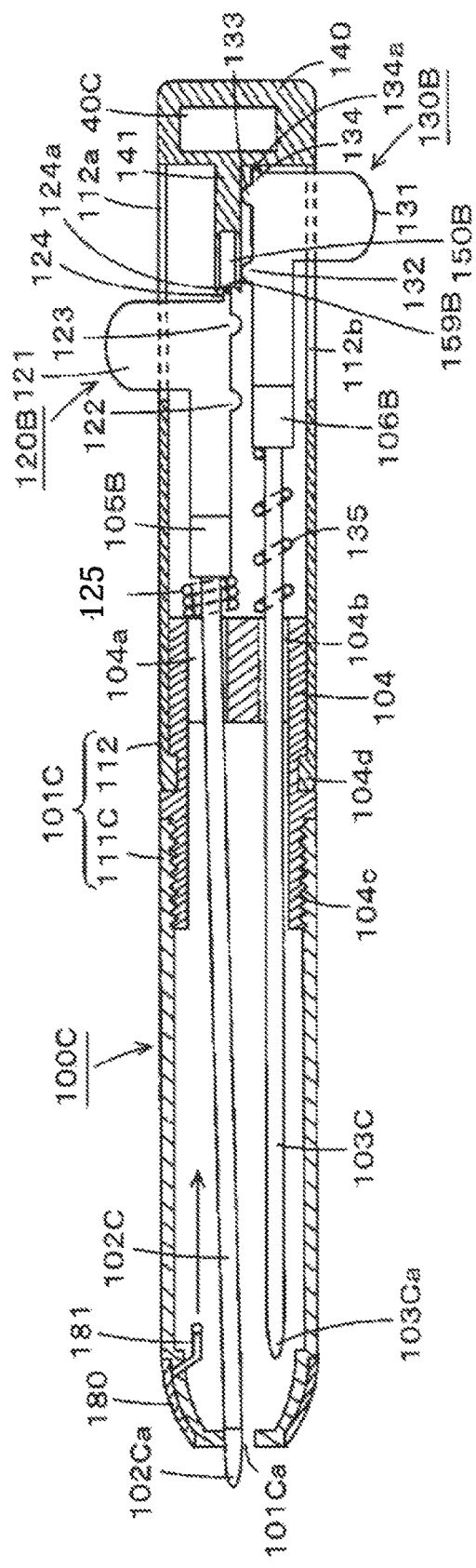
FIG. 11 is a diagram of assistance in explaining parts in an example of mechanical constitution of a fourth embodiment of the position indicator according to the present invention.

FIG. 11 is a sectional view of assistance in explaining an example of mechanical configuration of a position indicator 100C according to the fourth embodiment. FIG. 12 is a diagram indicating an example of configuration of an electronic circuit 40C of the position indicator 100C according to the fourth embodiment.

A constitution of a casing 101C of the position indicator 100C according to the fourth embodiment which constitution is on a locking member 140 side as an opposite side from an opening portion 101Ca side is similar to that the position indicator 100B according to the third embodiment. Specifically, as indicated in FIG. 11, the electronic circuit 40C in the case of the fourth embodiment is provided within a part of a cap portion of the locking member 140, and a pen pressure detecting portion 150B having a conductive pressure transmitting member 159B as described above is provided in a stopper 141 of the locking member 140. Similar to the position indicator 100B according to the third embodiment, the electronic circuit 40C disposed within the part of the cap portion of the locking member 140 and the pressure transmitting member 159B are electrically connected to each other (not indicated).

Similar to the position indicator 100B according to the third embodiment, a first knock operating portion 120B and a second knock operating portion 130B are arranged within the casing 101C, and a conductive tip 124a of a protruding portion 124 of the first operating portion 120B and a conductive tip 134a of a protruding portion 134 of the second operating portion 130B are engaged with and electrically connected to the pressure transmitting member 159B of the pen pressure detecting portion 150B by an operation of sliding movement.

A first core body 102C and a second core body 103C of the position indicator 100C according to the fourth embodiment are configured to have conductivity similar to the first core body 102B and the second core body 103B in the position indicator 100B according to the third embodiment. The first core body 102C is attached by being fitted to a fitting coupling portion 105B electrically connected to the tip 124a of the protruding portion 124. In addition, the second core body 103C is attached by being fitted to a fitting coupling portion 106B electrically connected to the tip 134a of the protruding portion 134.

In the position indicator 100C according to the fourth embodiment, as indicated in FIG. 11, the ferrite core 161 wound with the coil 162 is not provided on one end side where the opening portion 101Ca of the casing 101C is formed. Instead, a ring-shaped peripheral electrode 180 in a state in which the position of a central axis of a first casing portion 111C of the casing 101C of the position indicator 100C coincides with the position of a central axis of the peripheral electrode 180 is provided to an outer peripheral part on the opening portion 101Ca side of the first casing portion 111C so as to be exposed to the outside by being bonded to the outer peripheral part by an adhesive, for example.

The peripheral electrode 180 is formed of a conductive material, or a conductive metal in the present example. The first casing portion 111C formed by an insulator electrically insulates the peripheral electrode 180 from the first core body 102C and the second core body 103C made to project from the opening portion 101Ca to the outside. A lead portion 181 is led from the peripheral electrode 180 into a hollow portion of the first casing portion 111C so as to penetrate a wall portion of the first casing portion 111C. The lead portion 181 is electrically connected to the electronic circuit 40C through a conductor, which is not indicated in FIG. 11.

As indicated in FIG. 12, a source of supply of power supply voltage for a control circuit 400C, an ID memory 409, and other circuits in the position indicator 100C according to the fourth embodiment is a battery 410C of, for example, a button type or the like. The battery 410C is disposed in a state of being housed in a battery housing portion formed in the locking member 140, for example.

The position indicator 100C according to the fourth embodiment includes a wireless communication module 420C based on the Bluetooth (registered trademark) standard, for example. The control circuit 400C transmits the identification information of the position indicator 100C and the identification information of the core body whose tip projects from the opening portion 101Ca to the outside to the position detecting device through the wireless communication module 420C.

Similar to the control circuit 400B according to the foregoing embodiment, the control circuit 400C has a function of detecting a pen pressure value on the basis of the capacitance of a variable capacitor 150BC formed by the pen pressure detecting portion 150B, a function of detecting whether the first core body 102C and the second core body 103C are in the first state, the second state, or the third state as described above from a connection state between contact portions 142 and 143 and a connection state between contact portions 144 and 145, a function of reading identification information to be transmitted as additional information from the ID memory 409, and a function of generating additional information constituted of information about the detected pen pressure value and the read identification information. The control circuit 400C in the fourth embodiment further has a function of controlling a signal output from a transmission signal processing circuit 190.

The transmission signal processing circuit 190 in the present example receives a signal from the peripheral electrode 180 as an input signal, boosts the signal by amplification, and subjects the signal to predetermined processing such as phase inversion processing or the like. The transmission signal processing circuit 190 then supplies the signal resulting from the predetermined processing to the pressure transmitting member 159B.

In the fourth embodiment, when the first knock operating portion 120B is slidingly moved to make a tip 102Ca of the first core body 102C project from the opening portion 101Ca to the outside, the tip 124a of the protruding portion 124 of the first knock operating portion 120B is engaged with a recessed portion of the pressure transmitting member 159B. The tip 124a of the protruding portion 124 of the first knock operating portion 120B and the recessed portion of the pressure transmitting member 159B are thereby electrically connected to each other. The signal processed by the transmission signal processing circuit 190 is therefore supplied to the first core body 102C through the fitting coupling portion 105B and transmitted to the position detecting device.

When a tip 103Ca of the second core body 103C projects from the opening portion 101Ca to the outside, the tip 134a of the protruding portion 134 of the second knock operating portion 130B is engaged with the recessed portion of the pressure transmitting member 159B. The tip 134a of the protruding portion 134 of the second knock operating portion 130B and the recessed portion of the pressure transmitting member 159B are thereby electrically connected to each other. The signal processed by the transmission signal processing circuit 190 is therefore supplied to the second core body 103C through the fitting coupling portion 106B.

As described above, also in the position indicator 100C of the capacitive system according to the fourth embodiment, in the case where one of the tips of the plurality of core bodies is selectively projected from the opening portion 101a to the outside according to a knock operation, one pen pressure detecting portion can be shared between the plurality of core bodies. Thus, cost is reduced.

The position indicator of the capacitive system according to the fourth embodiment described above is configured to supply a signal to the core body whose tip is projected from the opening portion 101a by an operation of slidingly moving the knock operating portion 120C or 130C. Hence, a user can select a core body to be combined with the peripheral electrode 180 to transmit and receive signals to and from the position detecting device by merely performing an operation of selecting the core body by a knock operation. Therefore good usability is provided.

Incidentally, in the example of the above-described fourth embodiment, a signal from the position detecting device is received by the peripheral electrode 180, and the signal resulting from predetermined processing in the transmission signal processing circuit 190 is fed back to the position detecting device through the core body 102C or the core body 103C. Conversely, the signal from the position detecting device may be received through the core body 102C or the core body 103C, and the signal resulting from the predetermined processing in the transmission signal processing circuit 190 may be transmitted to the position detecting device through the peripheral electrode 180.

In addition, the battery 410C is provided as a power supply. However, also in the fourth embodiment, as in foregoing embodiments, a ferrite core 161 wound with a coil 162 may be provided to charge an electric double layer capacitor 410, and a voltage stored in the electric double layer capacitor 410 may be used as a power supply voltage.

Other Embodiments and Modifications

<Another Example of Pen Pressure Detecting Portion>

It is to be noted that while the pen pressure detecting portion in the foregoing embodiments has the constitution of a variable capacitor whose capacitance changes according to a pen pressure, such as the pen pressure detection described in Patent Document: Japanese Patent Laid-Open No. 2011-186803, the pen pressure detecting portion is not limited to this. The pen pressure detecting portion in the foregoing embodiments can also have a constitution using a semiconductor element whose capacitance is variable according to a pen pressure, as disclosed in Japanese Patent Laid-Open No. 2013-161307, for example.

Figure 13A:
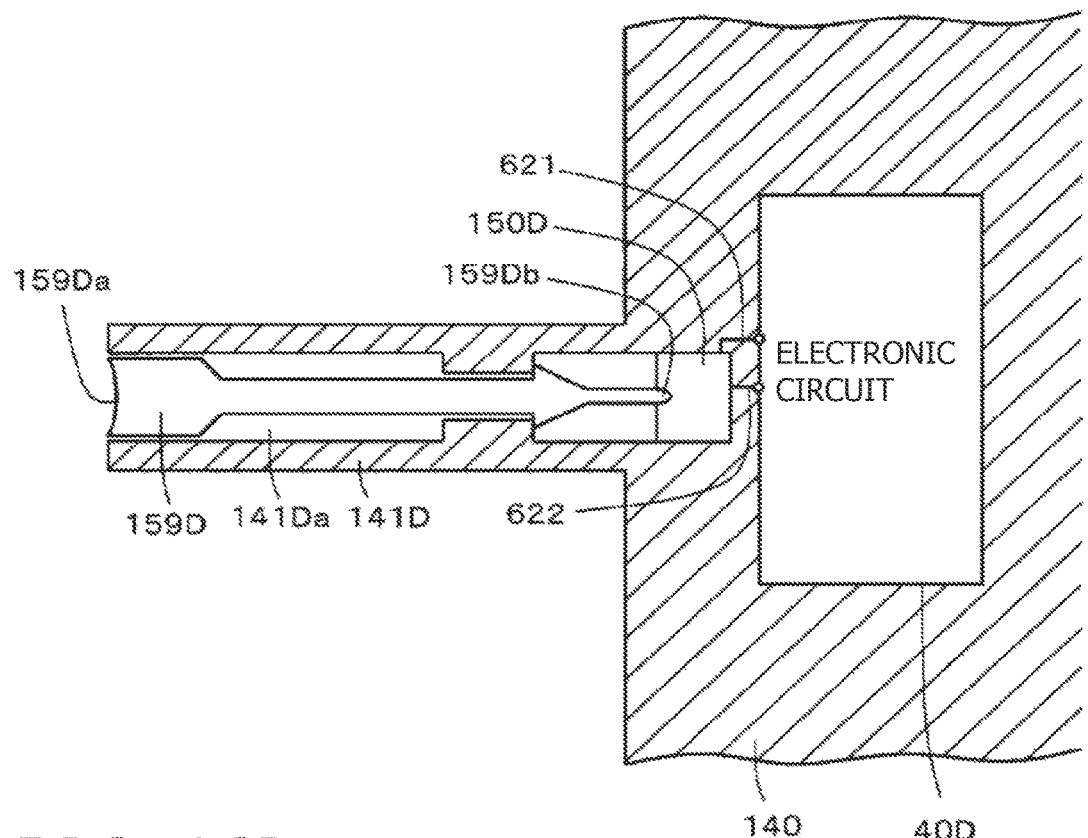
FIG. 13A is a diagram of assistance in explaining another example of constitution of a pen pressure detecting portion used in the position indicator according to the present invention.

FIG. 13A indicates an example in which a pen pressure detecting portion 150D is formed by a very small semiconductor device referred to as a so-called micro electro mechanical system (MEMS) in particular, and is applied to the position indicator 100 according to the first embodiment.

As indicated in FIG. 13A, the pen pressure detecting portion 150D in the present example is disposed in a part of the cap portion of the locking member 140 of the casing 101 of the position indicator 100. An electronic circuit 40D is also disposed in the cap portion of the locking member 140. One terminal 621 and another terminal 622 of a variable capacitor constituting the pen pressure detecting portion 150D are connected to the electronic circuit 40D by conductors, for example.

In the present example, a hollow portion 141Da housing a pressure transmitting member 159D movably in an axial direction with respect to the pen pressure detecting portion 150D is formed in a stopper 141D of the locking member 140. The pressure transmitting member 159D is a rod-shaped member as indicated in the figure, and is formed such that a tip 159Db of the pressure transmitting member 159D is fitted into the pen pressure detecting portion 150D. As in the pressure transmitting members according to the foregoing embodiments, a recessed portion 159Da to be engaged with the protruding portion 124 of the knock operating portion 120 or the protruding portion 134 of the knock operating portion 130 is formed on an opposite side of the pressure transmitting member 159D from a fitting portion thereof fitted into the pen pressure detecting portion 150D.

Figure 13B:
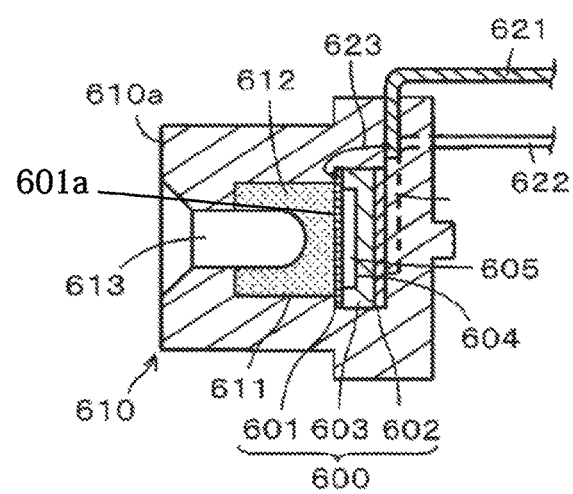
FIG. 13B is a sectional view of assistance in explaining the another example of constitution of the pen pressure detecting portion used in the position indicator according to the present invention.

FIG. 13B is a sectional view of assistance in explaining a constitution of the pen pressure detecting portion 150D used in the present example. The pen pressure detecting portion 150D in the present example is obtained by sealing a pressure sensing chip 600 formed as a semiconductor device manufactured by MEMS technology within, for example, a cubic or rectangular parallelepipedic box type package 610. The pressure sensing chip 600 detects an applied pressure as a change in capacitance.

The pressure sensing chip 600 in the present example is of a rectangular parallelepipedic shape having a longitudinal and a lateral length of 1.5 mm and a height of 0.5 mm, for example. As indicated in FIG. 13B, the pressure sensing chip 600 in the present example includes a first electrode 601, a second electrode 602, and an insulating layer (dielectric layer) 603 between the first electrode 601 and the second electrode 602. The first electrode 601 and the second electrode 602 in the present example are formed by a conductor made of single crystal silicon (Si).

On a surface side of the insulating layer 603 which surface side faces the first electrode 601, a circular recessed portion 604 having a central position of the surface as a center thereof is formed in the present example. The recessed portion 604 forms a space 605 between the insulating layer 603 and the first electrode 601.

In the pressure sensing chip 600 having the constitution as described above, a capacitance Cd is formed between the first electrode 601 and the second electrode 602. When a pressure is applied to the first electrode 601 from a top surface 601a side of the first electrode 601 which side is opposite from a surface of the first electrode 601 which surface faces the second electrode 602, the first electrode 601 bends to the space 605 side, a distance between the first electrode 601 and the second electrode 602 is shortened, and the value of the capacitance Cd changes so as to increase. An amount of bending of the first electrode 601 changes according to the magnitude of the applied pressure. Hence, the capacitance Cd is a variable capacitance corresponding to the magnitude of the pressure applied to the pressure sensing chip 600.

In the example of FIG. 13B, a recessed portion 611, such as covers the area of a part receiving the pressure in the pressure sensing chip 600, is provided under a top surface 610a of the package 610 which top surface is on a side of receiving the pressure by the pressure sensing chip 600. An elastic member 612 is filled inside the recessed portion 611. A communicating hole 613 communicating from the top surface 610a to a part of the elastic member 612 is formed in the package 610. The tip 159Db of the pressure transmitting member 159D is inserted into the communicating hole 613, and is locked by being press-fitted into the elastic member 612.

The terminal 621 connected to the first electrode 601 of the pressure sensing chip 600 is led out from the package 610 of the pressure sensing chip 600, and the terminal 622 connected to the second electrode 602 of the pressure sensing chip 600 is led out from the package 610 of the pressure sensing chip 600. In the present example, these terminals 621 and 622 are connected to the electronic circuit 40D, as described earlier. The electronic circuit 40D detects the capacitance of the pressure sensing chip, and thereby detects the value of the pen pressure received by the pen pressure detecting portion 150D in a similar manner to that described above.

The pressure transmitting member 159D engages with the protruding portion 124 of the knock operating portion 120 coupled to the first core body 102 or the protruding portion 134 of the knock operating portion 120 coupled to the second core body 103 whose tips projects from the opening portion 101a. The pen pressure detecting portion 150D therefore exhibits a capacitance Cv corresponding to a pen pressure applied to the tip 102a or 103a projecting from the opening portion 101a. The electronic circuit 40D detects the value of the pen pressure applied to the tip 102a or 103a of the first core body 102 or the second core body 103, respectively, from the capacitance Cv of the variable capacitor formed by the pen pressure detecting portion 150D.

Incidentally, while the pen pressure detecting portion 150D is disposed in the cap portion of the locking member 140, the pen pressure detecting portion 150D may be disposed in a part of the stopper 141 of the locking member 140 as in the foregoing embodiments.

In addition, while the pen pressure detecting portions 150 and 150B in the foregoing embodiments are disposed in a part of the stopper 141 of the locking member 140, the pen pressure detecting portions 150 and 150B may be disposed in a part of the cap portion of the locking member 140.

Incidentally, the pen pressure detecting portions are not limited to performing detection from the capacitance of a variable capacitor as in the foregoing examples, but may of course have a constitution using an element whose inductance value or resistance value changes according to an applied pen pressure (pressure).

Other Modifications

Incidentally, a wireless communication module may also be provided in the first embodiment and the third embodiment, and additional information, such as information about a pen pressure value and identification information, may be transmitted to the position detecting device through the wireless communication module. In addition, part of the additional information, for example, the information about the pen pressure value, may be transmitted through the resonance circuit 40R and a core body, and the identification information may be transmitted to the position detecting device through the wireless communication module.

In addition, while two core bodies are housed within a casing in the foregoing embodiments, it is needless to say that two or more core bodies may be housed within a casing.

The invention claimed is:
1. A position indicator, comprising:
a tubular casing having an opening;
a plurality of core bodies housed within the tubular casing;
a plurality of operating members coupled to respective core bodies of the plurality of core bodies, a selected operating member of the plurality of operating members making at least a tip of one core body coupled to the selected operating member project through the opening; and
a pen pressure detector common to the plurality of core bodies, the pen pressure detector being positioned within the casing,
and, in response to the selected operating member making at least the tip of the one core body project from the opening, the pen pressure detector being engaged with a side of the selected operating member that is opposite to a side of the selected operating member coupled to the one core body, and a pen pressure applied to the tip of the one core body being detected by the pen pressure detector.

2. The position indicator according to claim 1, wherein, when the pen pressure detector is engaged with the side of the selected operating member that is opposite to the side of the selected operating member coupled to the one core body, a recess of the pen pressure detector contacts a protrusion of the selected operating member.

3. The position indicator according to claim 1, further comprising:
a core body detector which, in operation, detects which core body of the plurality of core bodies has at least a tip projected from the opening; and
a transmitter which, in operation, transmits identification information of a core body detected by the core body detector, and transmits information about the pen pressure detected by the pen pressure detector.

4. The position indicator according to claim 1, further comprising a locking member which, in operation, locks the selected operating member so as to retain at least the tip of the one core body in a state of projecting from the opening, the pen pressure detector being positioned in the locking member.

5. The position indicator according to claim 1, further comprising:
a magnetic core wound with a coil, the magnetic core being positioned adjacent to the opening of the tubular casing, the magnetic core having a through hole that each of the plurality of core bodies is capable of being inserted into and passed through, the through hole communicating with the opening; and
a resonance circuit including the coil and a capacitor connected in parallel with the coil, the resonance circuit, in operation, electromagnetically couples the magnetic core to a sensor external to the position indicator.

6. The position indicator according to claim 5, wherein the pen pressure detector includes a variable capacitor which, in operation, changes in capacitance according to the pen pressure applied to the tip of the one core body.

7. The position indicator according to claim 5, wherein the position indicator, in operation, transmits information as an amplitude shift keying modulated signal resulting from operation and non-operation of the resonance circuit.

8. The position indicator according to claim 5, wherein at least one of the plurality of core bodies is a ballpoint pen refill that houses ink.

9. The position indicator according to claim 5, wherein at least one of the plurality of core bodies is formed of a resin material.

10. The position indicator according to claim 9, wherein the resin material has permeability that is substantially equal to permeability of a ballpoint pen refill.

11. The position indicator according to claim 1, further comprising:
a signal generating circuit,
wherein the plurality of core bodies are conductive, and
in response to the selected operating member making at least the tip of the one core body project from the opening, a signal from the signal generating circuit being supplied to the one core body.

12. The position indicator according to claim 11, further comprising a locking member which, in operation, locks the selected operating member so as to retain at least the tip of the one core body in a state of projecting from the opening,
wherein the signal from the signal generating circuit is supplied to the one core body through the locking member and the selected operating member.

13. The position indicator according to claim 11, further comprising:
a core body detector which, in operation, detects which core body of the plurality of core bodies has at least a tip of the core body projected from the opening,
wherein identification information of a core body detected by the core body detector and information about the pen pressure detected by the pen pressure are included in the signal from the signal generating circuit.

14. The position indicator according to claim 1, further comprising:
a peripheral electrode that encircles a central axis of the tubular casing, the peripheral electrode forming a tip of the tubular casing, the peripheral electrode being insulated from the one core body; and
a transmission signal processing circuit which, in operation, performs predetermined signal processing on an external signal received by the one core body and the peripheral electrode, and supplies a signal resulting from the signal processing to another core body of the plurality of core bodies having a tip projected from the opening and the peripheral electrode.

15. The position indicator according to claim 1, further comprising:
a core body detector which, in operation, detects which core body of the plurality of core bodies has at least a tip projected from the opening; and
a wireless communicator for wirelessly transmitting identification information of a core body detected by the core body detector and information about the pen pressure detected by the pen pressure detector.

16. A device, comprising:
a casing;
a pressure sensor;
a first core body including a tip and a base, the first core body having a first state in which the tip of the first core body is within the casing and a second state in which the tip of the first core body is external to the casing;
a first movable member which, in operation, changes the first core body between the first state to the second state, the first movable member including a mount that is coupled to the base of the first core body and a protrusion that contacts the pressure sensor when the first core body is in the second state;
a second core body including a tip and a base, the second core body having a first state in which the tip of the second core body is within the casing and a second state in which the tip of the second core body is external to the casing; and
a second movable member which, in operation, changes the second core body between the first state to the second state, the second movable member including a mount that is coupled to the base of the second core body and a protrusion that contacts the pressure sensor when the second core body is in the second state.

17. The device of claim 16, further comprising a support for the pressure sensor, the support including a first conductive contact, the first movable member including a second conductive contact, the first conductive contact and the second conductive contact being in physical contact with each other when the first core body is in the first state.

18. The device of claim 17, wherein the support includes a third conductive contact, the second movable member includes a fourth conductive contact, and the third conductive contact and the fourth conductive contact physically contact each other when the second core body is in the first state.

19. A method, comprising:
selecting a first operating member;
changing, in response to selecting the first operating member, a first core body from a first state in which a tip of the first core body is within a casing to a second state in which the tip of the first core body is external to the casing;
engaging the first operating member with a pressure sensor when the first core body is in the second state;
measuring, in response to engaging the first operating member with the pressure sensor, a pressure applied to the tip of the first core body;
selecting a second operating member;
changing, in response to selecting the second operating member, the first core body from the second state to the first state;
changing, in response to selecting the second operating member, a second core body from a first state in which a tip of the second core body is within the casing to a second state in which the tip of the second core body is external to the casing;
engaging the second operating member with the pressure sensor when the second core body is in the second state; and
measuring, in response to engaging the second operating member with the pressure sensor, a pressure applied to the tip of the second core body.

20. The method of claim 19, further comprising:
determining whether the first core body is in the first state or the second state; and
transmitting, in response to determining that the first core body is in the second state, identification information of the first core body and pressure information of the first core body.

\* \* \* \* \*